(12) United States Patent
Suzuki et al.

(10) Patent No.: US 9,699,780 B2
(45) Date of Patent: Jul. 4, 2017

(54) BASE STATION DEVICE, MOBILE STATION DEVICE, WIRELESS COMMUNICATION METHOD, INTEGRATED CIRCUIT, AND WIRELESS COMMUNICATION SYSTEM

(71) Applicant: Sharp Kabushiki Kaisha, Osaka-shi, Osaka (JP)

(72) Inventors: Shoichi Suzuki, Osaka (JP); Kimihiko Imamura, Osaka (JP); Katsunari Uemura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 246 days.

(21) Appl. No.: 14/410,690

(22) PCT Filed: Jun. 27, 2013

(86) PCT No.: PCT/JP2013/067620
§ 371 (c)(1),
(2) Date: Dec. 23, 2014

(87) PCT Pub. No.: WO2014/003104
PCT Pub. Date: Jan. 3, 2014

(65) Prior Publication Data
US 2015/0189648 A1 Jul. 2, 2015

(30) Foreign Application Priority Data
Jun. 27, 2012 (JP) .................. 2012-144084

(51) Int. Cl.
*H04W 72/04* (2009.01)
*H04W 28/06* (2009.01)
(Continued)

(52) U.S. Cl.
CPC ...... *H04W 72/0446* (2013.01); *H04B 7/2656* (2013.01); *H04L 5/0053* (2013.01);
(Continued)

(58) Field of Classification Search
CPC .......... H04W 72/0446; H04W 72/048; H04W 72/02; H04W 28/06; H04L 27/261;
(Continued)

(56) References Cited

U.S. PATENT DOCUMENTS

2011/0211503 A1 9/2011 Che et al.
2013/0272170 A1* 10/2013 Chatterjee ............. H04W 28/02
370/280
2013/0279481 A1 10/2013 Horiuchi et al.

FOREIGN PATENT DOCUMENTS

WO 2012/046403 A1 4/2012
WO 2012/068731 A1 5/2012

OTHER PUBLICATIONS

Intel Corporation, "Discussion on MCS Mismatch Between Regular and Flexible Subframes in Multi-cell Outdoor Pico Scenario" 3GPP TSG-RAN WG1 #69, R1-122643, May 21-25, 2012, pp. 1-5.
(Continued)

*Primary Examiner* — Obaidul Huq
(74) *Attorney, Agent, or Firm* — Keating & Bennett, LLP

(57) ABSTRACT

A base station device and a mobile station device efficiently communicate by using a flexible subframe. When a physical uplink shared channel and a sounding reference signal are not scheduled in a first flexible subframe, and at least the physical uplink shared channel is scheduled in a second flexible subframe immediately following the first flexible subframe, the mobile station device monitors a downlink grant which is used for scheduling the physical downlink shared channel in the first flexible subframe, and receives the physical downlink shared channel except for a last part in a time domain, in the first flexible subframe, based on the detected downlink grant.

8 Claims, 11 Drawing Sheets

(51) Int. Cl.
*H04L 5/14* (2006.01)
*H04B 7/26* (2006.01)
*H04W 72/02* (2009.01)
*H04L 27/26* (2006.01)
*H04L 5/00* (2006.01)

(52) U.S. Cl.
CPC .............. *H04L 5/14* (2013.01); *H04L 5/1469* (2013.01); *H04L 27/261* (2013.01); *H04L 27/2602* (2013.01); *H04W 28/06* (2013.01); *H04W 72/02* (2013.01); *H04W 72/048* (2013.01); *H04L 5/0048* (2013.01)

(58) Field of Classification Search
CPC ..... H04L 27/2602; H04L 5/14; H04L 5/0053; H04L 5/1469; H04L 5/0048; H04B 7/2656
USPC .......................................... 370/310, 328, 329
See application file for complete search history.

(56) References Cited

OTHER PUBLICATIONS

Huawei et al., "Methods to Support Different Time Scales for TDD UL-DL Reconfiguration", 3GPP TSG RAN WG1, Meeting #69, R1-122909, May 21-25, 2012, 4 pages.

Ericsson et al., "On Support of Different TDD UL-DL Configurations on Different Bands", 3GPP TSG-RAN WG1 #67, R1-114414, Nov. 14-18, 2011, 6 pages.

Ericsson et al., "On standardization impact of TDD UL-DL adaptation", 3GPP TSG-RAN WG1 Meeting #69, R1-122016, May 21-25, 2012, pp. 1-3.

CMCC et al., "Additional Special Subframe Configuration", 3GPP TSG RAN WG1, Meeting #69, R1-123063, May 25, 2012, 8 pages.

\* cited by examiner

FIG. 3

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
| 7 | 5 ms | D | S | U | F | F | D | S | U | F | F |

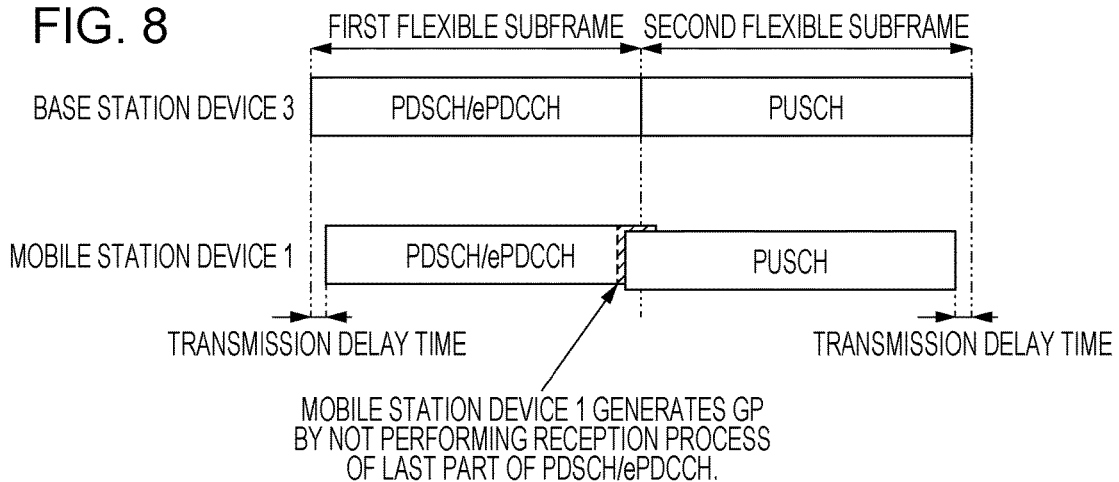
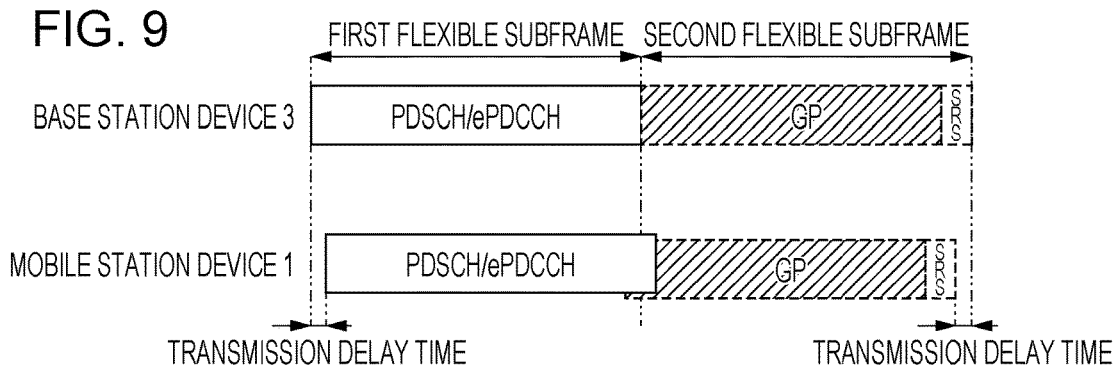
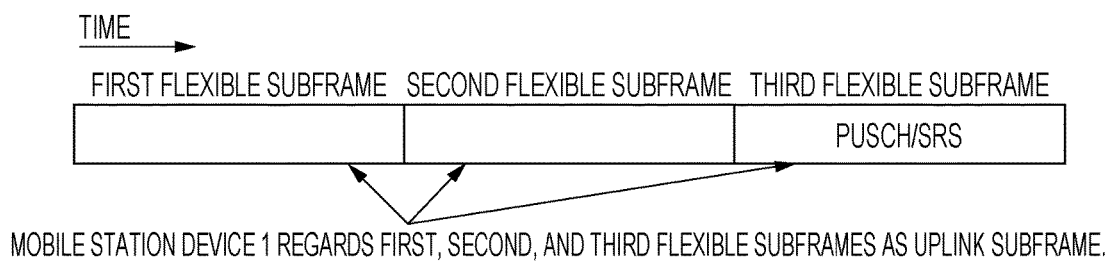
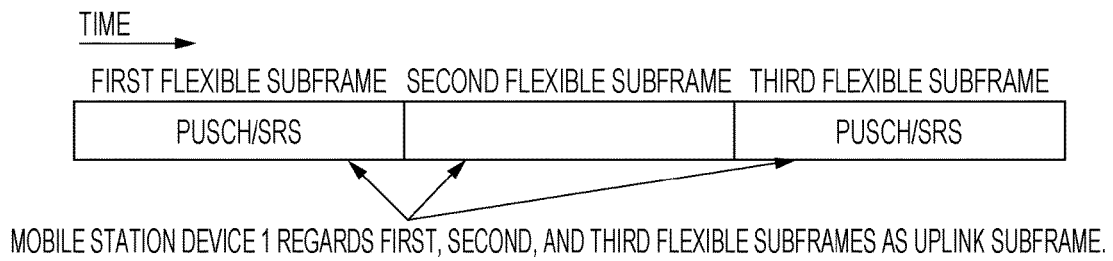

BASE STATION DEVICE, MOBILE STATION DEVICE, WIRELESS COMMUNICATION METHOD, INTEGRATED CIRCUIT, AND WIRELESS COMMUNICATION SYSTEM

TECHNICAL FIELD

The present invention relates to a base station device, a mobile station device, a wireless communication method, an integrated circuit, and a wireless communication system.

BACKGROUND ART

A wireless access scheme and a wireless network of cellular mobile communication (hereinafter, referred to as "long term evolution (LTE)" or "evolved universal terrestrial radio access (EUTRA)") have been developed by the 3rd generation partnership project (3GPP). In LTE, an orthogonal frequency division multiplexing (OFDM) scheme is used as a communication scheme of a downlink. Further, in LTE, a single-carrier frequency division multiple access (SC-FDMA) scheme is used as a communication scheme of an uplink. In LTE, a base station device is referred to as an evolved NodeB (eNodeB), and a mobile station device is referred to as user equipment (UE). LTE is a cellular communication system in which a plurality of areas which are controlled by base station devices are arranged in a cell-like shape. A single base station device may control a plurality of cells.

LTE corresponds to Time Division Duplex (TDD). The LTE employing a TDD scheme is referred to as TD-LTE or LTE TDD. The TDD is a technology that allows full-duplex communication in a single frequency band, by performing time-division multiplexing of an uplink signal and a downlink signal.

In 3GPP, it has been considered to apply a traffic adaptation technology for changing the ratio of the number of uplink resource to the number of downlink resource depending on the uplink traffic and the downlink traffic. In NPL 1, a method of using a flexible subframe has been presented as a method of realizing such traffic adaptation. A base station device can receive an uplink signal or transmit a downlink signal in the flexible subframe. In NPL 1, the mobile station device regards the flexible subframe as a downlink subframe, unless the base station device indicates the transmission of the uplink signal for the flexible subframe.

CITATION LIST

Non Patent Literature

NPL 1: "On standardization impact of TDD UL-DL adaptation", R1-122016, 3GPP TSG-RAN WG1 MEETING #69, Prague, Czech Republic, 21-25 May 2012.

SUMMARY OF INVENTION

Technical Problem

A significant improvement in a packet throughput is obtained in a case of employing traffic adaptation technology, as compared to a case of not changing the ratio of the number of uplink resource to the number of downlink resource. However, the traffic adaptation technology using the flexible subframe is not completely established.

The present invention has been made in view of the above situations, and an object is to provide a base station device, a mobile station device, a wireless communication method, a wireless communication system, and an integrated circuit which can effectively communicate by using the flexible subframe.

Solution to Problem (1) In order to achieve the above object, the present invention includes the following means. In other words, a mobile station device of the present invention is a mobile station device which communicates with a base station device, in which in a case where a physical uplink shared channel and a sounding reference signal are not scheduled in a first flexible subframe, and at least the physical uplink shared channel is scheduled in a second flexible subframe immediately following the first flexible subframe, the mobile station device monitors a downlink grant which is used for scheduling the physical downlink shared channel in the first flexible subframe, and receives the physical downlink shared channel except for a last part in a time domain, in the first flexible subframe, based on the detected downlink grant.

(2) Further, the mobile station device of the present invention monitors an uplink grant which is used for scheduling the physical uplink shared channel and/or the sounding reference signal in the first flexible subframe and the second flexible subframe, in a subframe preceding the first flexible subframe.

(3) Further, a wireless communication method of the present invention is a wireless communication method used in a mobile station device which communicates with a base station device, including, in a case where a physical uplink shared channel and a sounding reference signal are not scheduled in a first flexible subframe, and at least the physical uplink shared channel is scheduled in a second flexible subframe immediately following the first flexible subframe, monitoring a downlink grant which is used for scheduling the physical downlink shared channel in the first flexible subframe, and receiving the physical downlink shared channel except for a last part in a time domain, in the first flexible subframe, based on the detected downlink grant.

(4) Further, an integrated circuit of the present invention is an integrated circuit implemented in a mobile station device which communicates with a base station device, the integrated circuit causes the mobile station device to execute: in a case where a physical uplink shared channel and a sounding reference signal are not scheduled in a first flexible subframe, and at least the physical uplink shared channel is scheduled in a second flexible subframe immediately following the first flexible subframe, a function of monitoring a downlink grant which is used for scheduling the physical downlink shared channel in the first flexible subframe, and a function of receiving the physical downlink shared channel except for a last part in a time domain, in the first flexible subframe, based on the detected downlink grant.

(5) Further, a wireless communication system of the present invention is a wireless communication system in which a mobile station device and a base station device communicate, in which the mobile station device, in a case where a physical uplink shared channel and a sounding reference signal are not scheduled in a first flexible subframe, and at least the physical uplink shared channel is scheduled in a second flexible subframe immediately following the first flexible subframe, monitors a downlink grant which is used for scheduling the physical downlink shared channel in the first flexible subframe, and receives the physical downlink shared channel except for a last part in a time domain, in the first flexible subframe, based on the detected downlink grant.

(6) Further, a mobile station device of the present invention is a mobile station device which communicates with a base station device, in which the mobile station device does not monitor a downlink grant which is used for scheduling a physical downlink shared channel in a first flexible subframe and a second flexible subframe, in a case where the physical uplink shared channel and a sounding reference signal are not scheduled in the first flexible subframe, and at least the physical uplink shared channel is scheduled in the second flexible subframe immediately following the first flexible subframe.

(7) Further, a wireless communication method of the present invention is a wireless communication method used in a mobile station device which communicates with a base station device, including not monitoring a downlink grant which is used for scheduling a physical downlink shared channel in a first flexible subframe and a second flexible subframe, in a case where the physical uplink shared channel and a sounding reference signal are not scheduled in the first flexible subframe, and at least the physical uplink shared channel is scheduled in the second flexible subframe immediately following the first flexible subframe.

(8) Further, an integrated circuit of the present invention is an integrated circuit implemented in a mobile station device which communicates with a base station device, the integrated circuit causes the mobile station device to execute: a function of controlling not to monitor a downlink grant which is used for scheduling a physical downlink shared channel in a first flexible subframe and a second flexible subframe, in a case where the physical uplink shared channel and a sounding reference signal are not scheduled in the first flexible subframe, and at least the physical uplink shared channel is scheduled in the second flexible subframe immediately following the first flexible subframe.

(9) Further, a wireless communication system of the present invention is a wireless communication system in which a mobile station device and a base station device communicate, wherein the mobile station device does not monitor a downlink grant which is used for scheduling a physical downlink shared channel in a first flexible subframe and a second flexible subframe, in a case where the physical uplink shared channel and a sounding reference signal are not scheduled in the first flexible subframe, and at least the physical uplink shared channel is scheduled in the second flexible subframe immediately following the first flexible subframe.

(10) Further, a mobile station device of the present invention is a mobile station device which communicates with a base station device, wherein the mobile station device, in a case where any one or both of an uplink physical channel and an uplink physical signal are scheduled in at least one of continuous flexible subframes in a time domain, regards a flexible subframe in which any one or both of the uplink physical channel and the uplink physical signal are scheduled, among the continuous flexible subframes, as an uplink subframe, regards a flexible subframe preceding the flexible subframe in which any one or both of the uplink physical channel and the uplink physical signal are scheduled, among the continuous subframes, as an uplink subframe, and regards a flexible subframe following a last flexible subframe in which any one or both of the uplink physical channel and the uplink physical signal are scheduled, among the continuous subframes, as a downlink subframe.

(11) Further, in the present invention, in a case where the uplink physical channel and the uplink physical signal are not scheduled in any of the continuous flexible subframes, the mobile station device regards all of the continuous flexible subframes as a downlink subframe.

(12) Further, in the present invention, the mobile station device does not monitor a downlink grant which is used for scheduling a downlink physical channel, in a flexible subframe which is regarded as the uplink subframe.

(13) Further, in the present invention, the mobile station device monitors a downlink grant which is used for scheduling a downlink physical channel, in a flexible subframe which is regarded as the downlink subframe.

(14) Further, a wireless communication method of the present invention is a wireless communication method used in a mobile station device which communicates with a base station device, including: in a case where any one or both of an uplink physical channel and an uplink physical signal are scheduled in at least one of continuous flexible subframes in a time domain, regarding a flexible subframe in which any one or both of the uplink physical channel and the uplink physical signal are scheduled, among the continuous flexible subframes, as an uplink subframe, regarding a flexible subframe preceding the flexible subframe in which any one or both of the uplink physical channel and the uplink physical signal are scheduled, among the continuous subframes, as an uplink subframe, and regarding a flexible subframe following a last flexible subframe in which any one or both of the uplink physical channel and the uplink physical signal are scheduled, among the continuous subframes, as a downlink subframe.

(15) Further, an integrated circuit of the present invention is an integrated circuit implemented in a mobile station device which communicates with a base station device, the integrated circuit causes the mobile station device to execute: in a case where any one or both of an uplink physical channel and an uplink physical signal are scheduled in at least one of continuous flexible subframes in a time domain, a function of regarding a flexible subframe in which any one or both of the uplink physical channel and the uplink physical signal are scheduled, among the continuous flexible subframes, as an uplink subframe, a function of regarding a flexible subframe preceding the flexible subframe in which any one or both of the uplink physical channel and the uplink physical signal are scheduled, among the continuous subframes, as an uplink subframe, and a function of regarding a flexible subframe following a last flexible subframe in which any one or both of the uplink physical channel and the uplink physical signal are scheduled, among the continuous subframes, as a downlink subframe.

(16) Further, a wireless communication system of the present invention is a wireless communication system in which a mobile station device and a base station device communicate, wherein the mobile station device, in a case where any one or both of an uplink physical channel and an uplink physical signal are scheduled in at least one of continuous flexible subframes in a time domain, regards a flexible subframe in which any one or both of the uplink physical channel and the uplink physical signal are scheduled, among the continuous flexible subframes, as an uplink subframe, regards a flexible subframe preceding the flexible subframe in which any one or both of the uplink physical channel and the uplink physical signal are scheduled, among the continuous subframes, as an uplink subframe, and regards a flexible subframe following a last flexible subframe in which any one or both of the uplink physical channel and the uplink physical signal are scheduled, among the continuous subframes, as a downlink subframe.

Advantageous Effects of Invention

According to the present invention, the base station device and the mobile station device are able to efficiently communicate by using a flexible subframe.

BRIEF DESCRIPTION OF DRAWINGS

FIG. 3 is a table representing an example of a configuration of a subframe of the radio frame of the present embodiment.

FIG. 8 is a diagram illustrating an example of a transmission and reception process in a first embodiment of the present invention.

FIG. 9 is another diagram illustrating an example of the transmission and reception process in the first embodiment of the present invention.

FIG. 10 is a diagram illustrating a first example of a third embodiment of the present invention.

FIG. 11 is a diagram illustrating a second example of the third embodiment of the present invention.

DESCRIPTION OF EMBODIMENTS

Hereinafter, embodiments of the present invention will be described.

In the present embodiment, a mobile station device communicates with a single cell. However, the present invention may be applied to the case in which the mobile station device communicates with a plurality of cells. A technology in which the mobile station device communicates with a plurality of cells is referred to as cell aggregation or carrier aggregation. In the case of cell aggregation, the present invention may be applied to each of a plurality of cells. Alternatively, in the case of cell aggregation, the present invention may be applied to some of the plurality of cells.

Further, a time division duplex (TDD) scheme is applied to a wireless communication system of the present embodiment.

Figure 1:
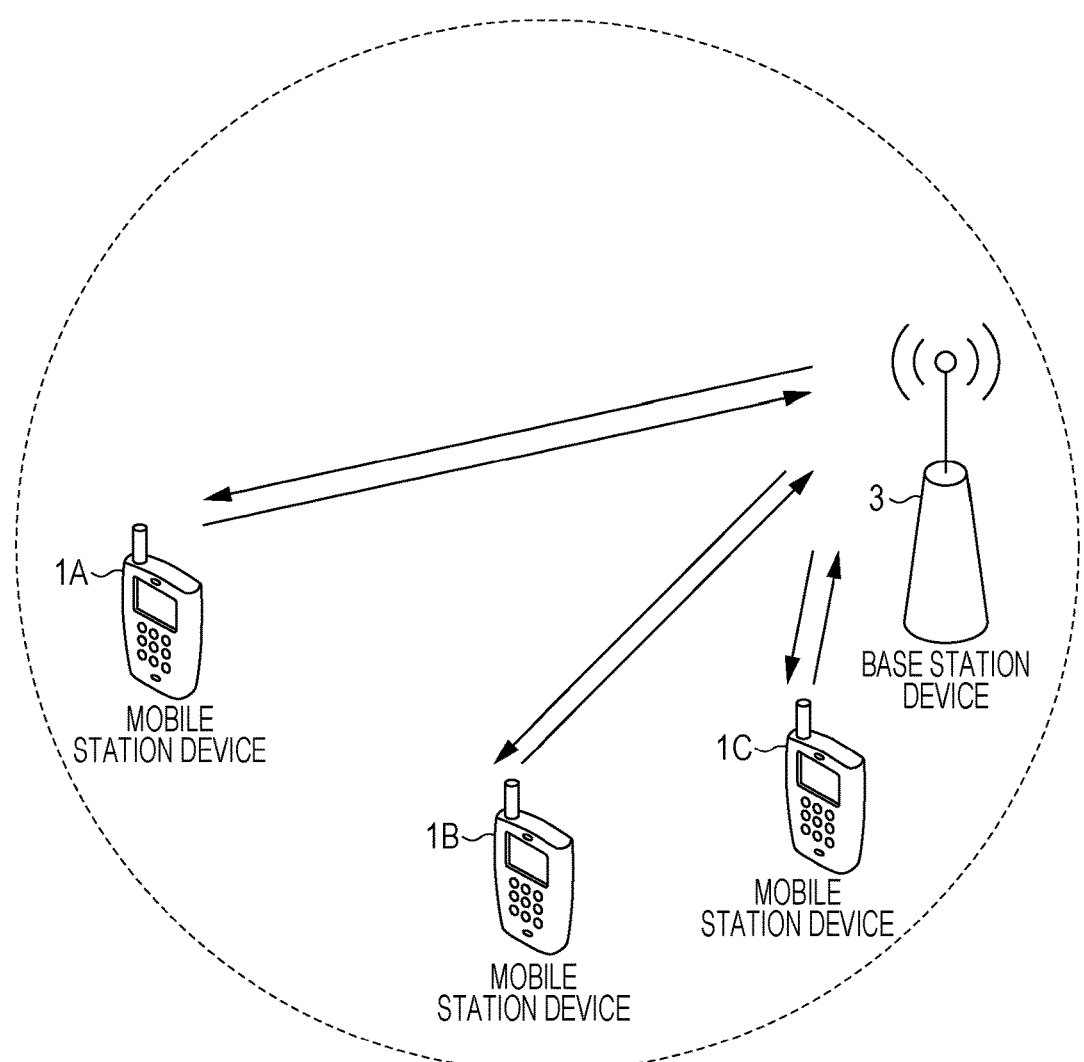
FIG. 1 is a schematic diagram of a wireless communication system of the present embodiment.

FIG. 1 is a conceptual diagram of a wireless communication system of the present embodiment. In FIG. 1, the wireless communication system includes a base station device 3 and mobile station devices 1A to 1C. Hereinafter, the mobile station devices 1A to 1C are collectively referred to as a mobile station device 1.

Physical channels and physical signals of the present embodiment will be described.

In FIG. 1, in uplink wireless communication from the mobile station device 1 to the base station device 3, the following uplink physical channels are used. The uplink physical channels are used for transmitting information which is output from a higher layer.

Physical Uplink Control Channel (PUCCH)
Physical Uplink Shared Channel (PUSCH)
Physical Random Access Channel (PRACH)

The PUCCH is a physical channel used for transmitting Uplink Control Information (UCI). The uplink control information includes Channel State Information (CSI) of a downlink, a Scheduling Request (SR) indicating a request for resources of the PUSCH, and acknowledgement (ACK)/negative-acknowledgement (NACK) indicating the success or failure of decoding of the downlink data that the mobile station device 1 has received.

The PUSCH is a physical channel used for transmitting Uplink data (Uplink-Shared Channel: UL-SCH). Further, the PUSCH may be used for transmitting ACK/NACK and/or channel state information as well as Uplink data. Further, the PUSCH may be used for transmitting only the ACK/NACK and/or the channel state information.

The PRACH is a physical channel used for transmitting a random access preamble. The primary purpose of the PRACH is for the base station device 3 to perform synchronization with the mobile station device 1 on the time domain. In addition thereto, the PRACH is used for an initial connection establishment procedure, a handover procedure, a connection re-establishment procedure, a synchronization for uplink transmission (timing adjustment), and a request for allocation of uplink radio resources.

In FIG. 1, in the uplink wireless communication, the following uplink physical signals are used. The uplink physical signals are not used for transmitting information which is output from a higher layer, and are used by a physical layer.

Uplink Reference Signal (UL RS)

In the present embodiment, the following two types of uplink reference signals are used.

Demodulation Reference Signal (DMRS)
Sounding Reference Signal (SRS)

The DMRS relates to transmission of the PUSCH or the PUCCH. The DMRS is time-multiplexed with the PUSCH or the PUCCH. The base station device 3 uses the DMRS for performing channel compensation of the PUSCH or the PUCCH. Hereinafter, transmission of the PUSCH and the DMRS is simply referred to as PUSCH transmission. Hereinafter, transmission of the PUCCH and the DMRS is simply referred to as PUCCH transmission.

The SRS does not relate to transmission of the PUSCH or the PUCCH. The base station device 3 uses the SRS for detecting an uplink channel state. The mobile station device 1 transmits a first SRS in a first resource configured by a higher layer. Further, when the mobile station device 1 receives information indicating a request for transmitting the SRS through the PDCCH, the mobile station device 1 transmits a second SRS only one time in a second resource configured by a higher layer. The first SRS is also referred to as a periodic SRS. The second SRS also is referred to as an aperiodic SRS.

In FIG. 1, in downlink wireless communication from the base station device 3 to the mobile station device 1, the following downlink physical channels are used. The downlink physical channels are used for transmitting information which is output from a higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
enhanced Physical Downlink Control Channel (ePDCCH)
Physical Downlink Shared Channel (PDSCH)

The PBCH is used for broadcasting of system information (master information block, Broadcast Channel: BCH) which is commonly used in the mobile station devices 1. The PBCH is transmitted at intervals of 40 ms. The timing of the interval of 40 ms is blind-detected in the mobile station device 1. Further, the PBCH is retransmitted at intervals of 10 ms.

The PCFICH is used for transmitting information indicating a region (OFDM symbol) which is reserved for the PDCCH transmission.

The PHICH is used for transmitting a HARQ indicator (HARQ feedback, response information) indicating ACK (ACKnowledgement) or NACK (Negative ACKnowledgement) for uplink data (Uplink Shared Channel: UL-SCH) received by the base station device 3. For example, when the base station device 3 successfully decodes the uplink data, ACK is set in the HARQ indicator for the uplink data. For example, when the base station device 3 fails to decode the uplink data, NACK is set in the HARQ indicator for the uplink data. In a single PHICH, a HARQ indicator for a single uplink data is transmitted. The base station device 3 transmits respective HARQ indicators for a plurality of pieces of uplink data included in the same PDSCH by using a plurality of PHICHs.

The PDCCH and the ePDCCH are used for transmitting downlink control information (DCI). The downlink control information includes a downlink grant (also referred to as downlink assignment) and an uplink grant. The downlink grant is downlink control information used for scheduling a single PDSCH in a single cell. The downlink grant is used for scheduling the PDSCH in the same subframe as the subframe in which the downlink grant is transmitted. The uplink grant is downlink control information used for scheduling a single PUSCH in a single cell. The uplink grant is used for scheduling a single PUSCH in the subframe which is four or more subframes after the subframe in which the uplink grant is transmitted. Further, the downlink control information includes downlink control information format 3 (DCI format 3) which is configured with a plurality of transmission power control commands (TPC commands) targeted for each of a plurality of mobile station devices 1.

The PUSCH is used for transmitting downlink data (Downlink Shared Channel: DL-SCH).

In FIG. 1, in downlink wireless communication, the following downlink physical signals are used. The downlink physical signals are not used for transmitting information which is output from a higher layer, and are used by a physical layer.

synchronization signal (SS)
downlink reference signal (DL RS)

The synchronization signal is used for the mobile station device 1 to synchronize the frequency domain and the time domain of a downlink. The downlink reference signal is used for the mobile station device 1 to perform channel compensation of the downlink physical channel. The downlink reference signal is used for the mobile station device 1 to calculate downlink channel state information.

The BCH, the UL-SCH, the DL-SCH, and the like are transport channels. The channel used in the Medium Access Control (MAC) layer is referred to as a transport channel. The unit of the transport channel used in the MAC layer is also referred to as a transport block (TB) or MAC Protocol Data Unit (PDU). The control of the Hybrid Automatic Repeat request (HARQ) is performed for each transport block in the MAC layer. The transport block is a unit of data to be transport delivered from the MAC layer to the physical layer. In the physical layer, the transport block is mapped to a codeword, and is subjected to a coding process for each codeword.

Hereinafter, the configuration of the radio frame of the present embodiment will be described.

Figure 2:
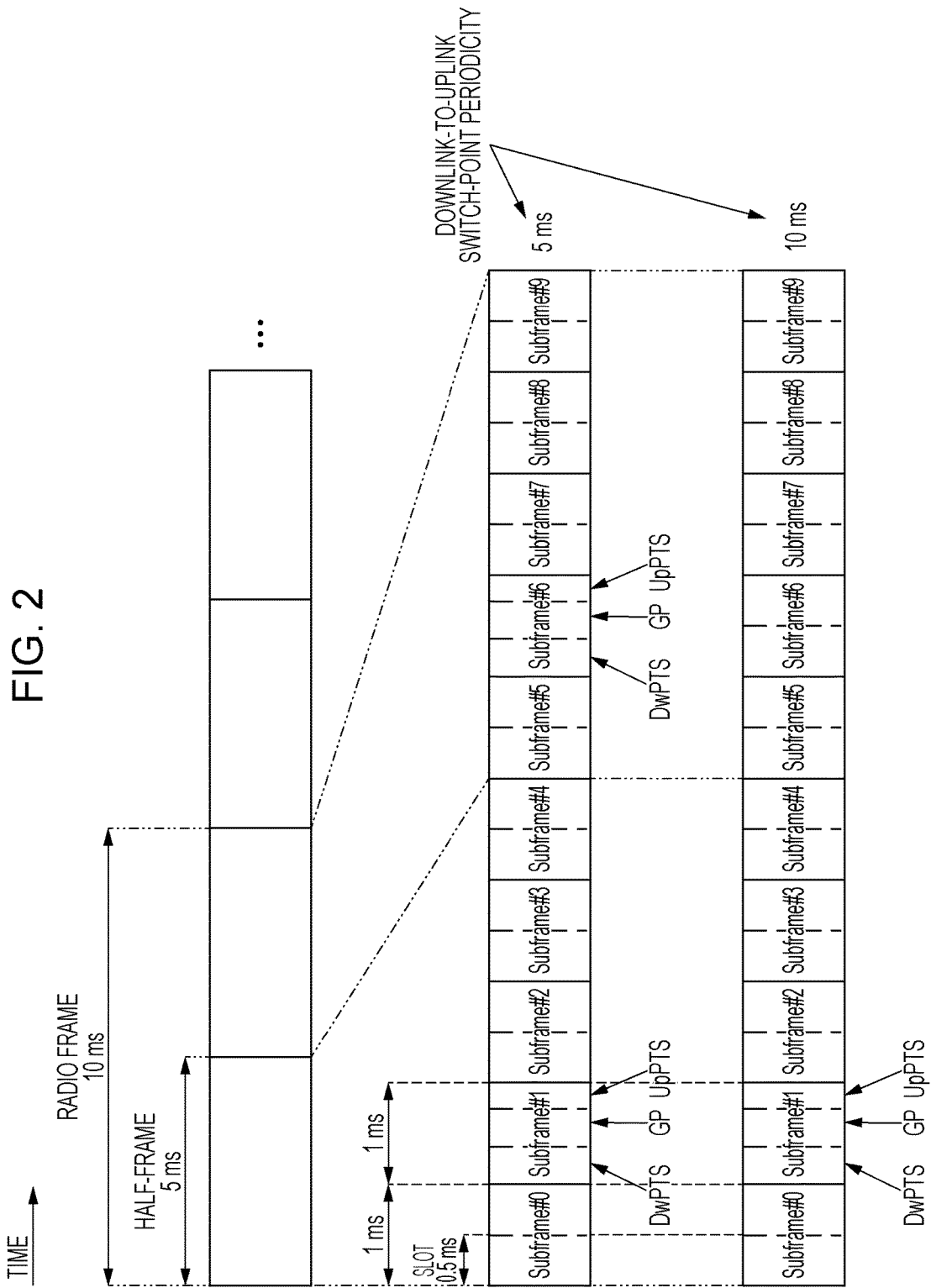
FIG. 2 is a diagram illustrating a schematic configuration of a radio frame of the present embodiment.

FIG. 2 is a diagram illustrating a schematic configuration of a radio frame of the present embodiment. The length of each of the radio frames is 10 ms. Further, each radio frame is configured with two half-frames. The length of each half-frame is 5 ms. Each half-frame is configured with five subframes. The length of each subframe is 1 ms, and each subframe is defined as two continuous slots. The i-th subframe in the radio frame is configured with the (2×i)-th slot and the (2×i+1)-th slot. In other words, ten subframes may be used in each interval of 10 ms. The length of each slot is 0.5 ms.

In the present embodiment, the following four types of subframes are used.

downlink subframe
uplink subframe
special subframe
flexible subframe

The downlink subframe is a subframe that is reserved for downlink transmission. The uplink subframe is a subframe that is reserved for uplink transmission. The special subframe is configured with three fields. The three fields are a downlink pilot time slot (DwPTS), a guard period (GP), and an uplink pilot time slot (UpPTS). The total length of the DwPTS, the GP, and the UpPTS is 1 ms. The DwPTS is a field that is reserved for downlink transmission. The UpPTS is a field that is reserved for uplink transmission.

The flexible subframe is a subframe in which downlink transmission and/or uplink transmission are performed. The base station device 3 and the mobile station device 1 may regard the flexible subframe as the downlink subframe. Further, the base station device 3 and the mobile device 1 may regard the flexible subframe as the uplink subframe. Further, the base station device 3 and the mobile station device 1 may regard the flexible subframe as the subframe including the field that is reserved for uplink transmission and the field that is reserved for downlink transmission.

A single radio frame is configured with at least a downlink subframe, an uplink subframe, and a special subframe. FIG. 3 is a table representing an example of a configuration of a subframe of a radio frame of the present embodiment. In FIG. 3, the configuration of the subframe of the radio frame is referred to as an uplink-downlink configuration. FIG. 3 shows eight uplink-downlink configurations. In FIG. 3, D indicates the downlink subframe, U indicates the uplink subframe, S indicates the special subframe, and F indicates the flexible subframe.

The wireless communication system of the present embodiment supports the downlink-to-uplink switch-point periodicity of 5 ms and 10 ms. When the downlink-to-uplink switch-point periodicity is 5 ms, the special frame is included in both half-frames in the radio frame. When the downlink-to-uplink switch-point periodicity is 10 ms, the special frame is included only in the first half-frames in the radio frame.

The subframes 0 and 5, and the DwPTS are always reserved for downlink transmission. The subframe immediately following the special subframe and the UpPTS are always reserved for uplink transmission. The flexible subframe may be configured only in the subframes 3, 4, 8, and 9 in the radio frame.

The base station device 3 notifies the mobile station device 1 of information indicating the configuration (the lengths of the DwPTS, the GP, and the UpPTS) of the special subframe and information indicating uplink-downlink configuration. For example, the base station device 3 transmits a system information block including the information by using the PDSCH.

Hereinafter, the configuration of the slot of the present embodiment will be described.

Figure 4:
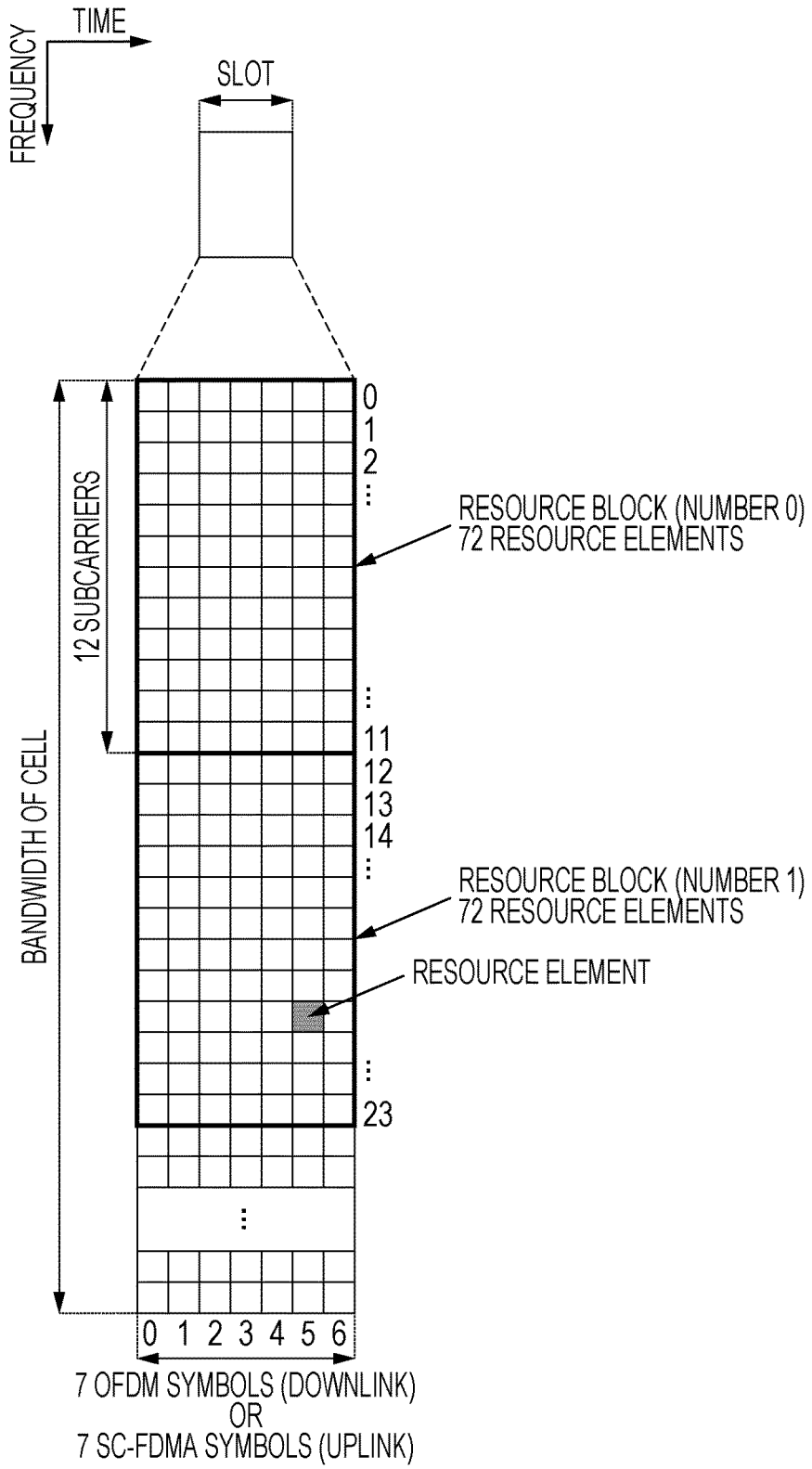
FIG. 4 is a diagram illustrating a configuration of a slot of the present embodiment.

FIG. 4 is a diagram illustrating a configuration of a slot of the present embodiment. The physical signal or the physical channel transmitted in each slot is represented by a resource grid. In the downlink, the resource grid is defined as a plurality of subcarriers and a plurality of OFDM symbols. In the uplink, the resource grid is defined as a plurality of subcarriers and a plurality of SC-FDMA symbols. The number of subcarriers configuring one slot depends on the bandwidth of a cell. The number of OFDM symbols or SC-FDMA symbols configuring one slot is seven. Each element in the resource grid is referred to as a resource element. The resource element is identified by using a subcarrier number, and an OFDM symbol number or a SC-FDMA symbol number.

The resource block is used to represent the mapping of the resource element of a physical channel (the PDSCH, the PUSCH, or the like). The resource block is defined as a virtual resource block and a physical resource block. A certain physical channel is first mapped to the virtual resource block. Next, the virtual resource block is mapped to the physical resource block. One physical resource block is defined as seven continuous OFDM symbol or SC-FDMA symbols in a time domain and 12 continuous subcarriers in a frequency domain. Therefore, one physical resource block is configured with (7×12) resource elements. Further, one physical resource block corresponds to one slot in the time domain, and corresponds to 180 kHz in the frequency domain. The physical resource blocks are numbered from 0 in the frequency domain.

Hereinafter, the physical channel and the physical signal transmitted in each subframe will be described.

Figure 5:
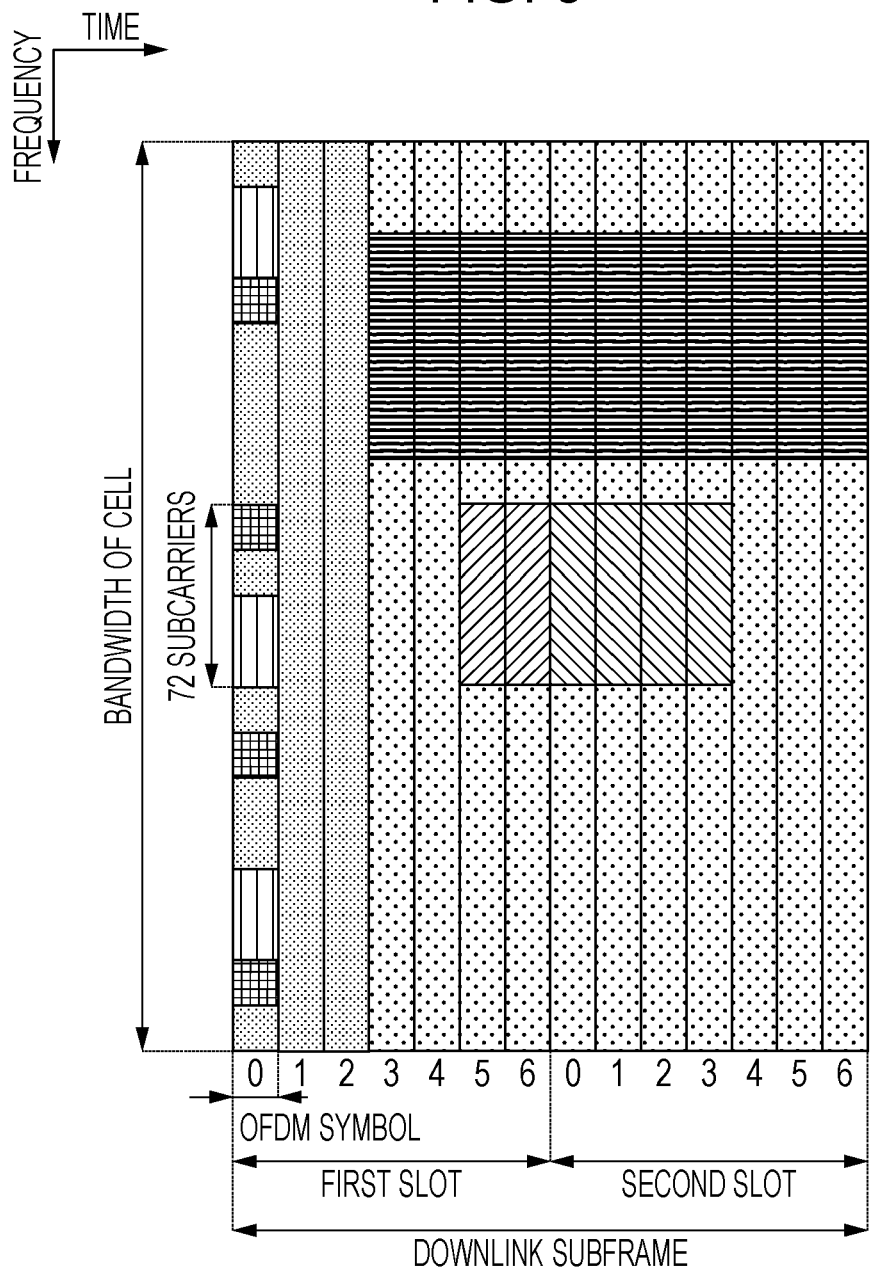
FIG. 5 is a diagram illustrating an example of an arrangement of physical channels and physical signals in a downlink subframe of the present embodiment.

FIG. 5 is a diagram illustrating an example of an arrangement of the physical channels and the physical signals in the downlink subframe of the present embodiment. The base station device 3 is able to transmit the downlink physical channels (the PBCH, the PCFICH, the PHICH, the PDCCH, the ePDCCH, the PDSCH), and the downlink physical signals (the synchronization signal, and the downlink reference signal) in the downlink subframe. Further, the PBCH is transmitted only in the subframe 0 in the radio frame. Further, the synchronization signal is disposed only in the subframes 0 and 5 in the radio frame. Further, the downlink reference signal is disposed in the resource elements distributed in the frequency domain and the time domain. In order to simplify a description, the downlink reference signal is not shown in FIG. 5.

In the PDCCH region, a plurality of PDCCHs are frequency-multiplexed and time-multiplexed. In the ePDCCH region, a plurality of ePDCCHs are frequency-multiplexed, time-multiplexed, and spatially multiplexed. In the PDSCH region, a plurality of PDSCHs are frequency-multiplexed and spatially multiplexed. The PDCCH, the PDSCH, or the ePDCCH are time-multiplexed. The PDSCH and the ePDCCH are frequency-multiplexed.

The base station device 3 transmits the PDCCH (uplink grant) regarding the PUSCH of the uplink subframe or the flexible subframe only in the downlink subframe. Further, the base station device 3 transmits the PHICH (ACK/NACK) regarding the PUSCH of the uplink subframe or the flexible subframe only in the downlink subframe.

Figure 6:
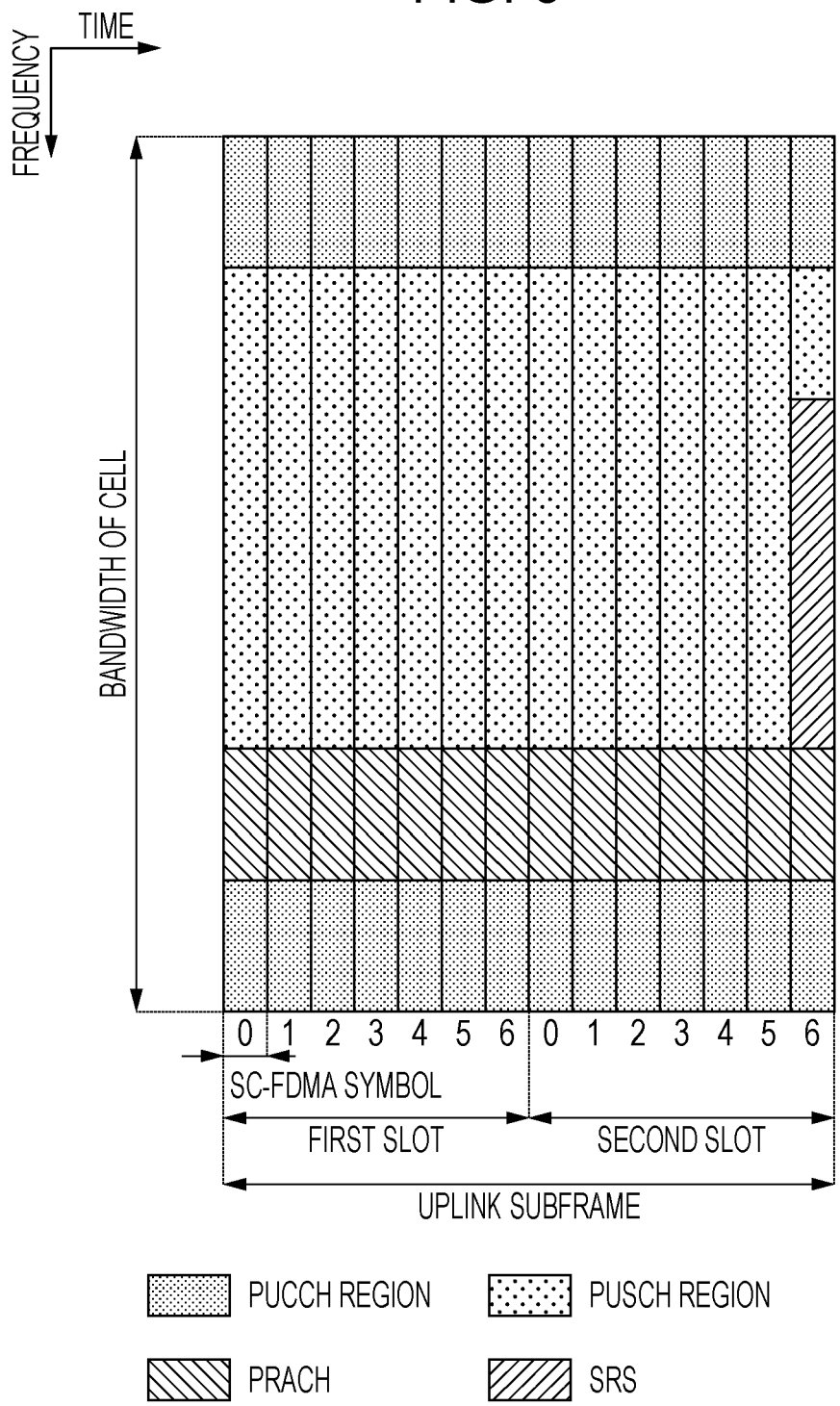
FIG. 6 is a diagram illustrating an example of an arrangement of physical channels and physical signals in an uplink subframe of the present embodiment.

FIG. 6 is a diagram illustrating an example of an arrangement of the physical channels and the physical signals in the uplink subframe of the present embodiment. The mobile station device 1 transmits the uplink physical channel (the PUCCH, the PUSCH, and the PRACH), and the uplink physical signal (the DMRS, and the SRS) in the uplink subframe. In the PUCCH region, a plurality of PUCCHs are frequency-multiplexed, time-multiplexed, and concurrence-multiplexed. In the PUSCH region, a plurality of PUSCHs are frequency-multiplexed, and spatially multiplexed. The PUCCH and the PUSCH are frequency-multiplexed. The PRACH is disposed in a single subframe or two subframes. Further, a plurality of PRACHs are code-multiplexed.

The SRS is transmitted by using the last SC-FDMA symbol in the uplink subframe. In other words, the SRS is disposed in the last SC-FDMA symbol in the uplink subframe. The mobile station device 1 is not able to simultaneously transmit the SRS and the PUCCH/PUSCH/PRACH in a single cell. In a single uplink subframe of a single cell, the mobile station device 1 is able to transmit the PUSCH and/or the PUCCH by using the SC-FDMA symbol other than the last SC-FDMA symbol in the uplink subframe, and the SRS by using the last SC-FDMA symbol in the uplink subframe. In other words, in a single uplink subframe of a single cell, the mobile station device 1 is able to transmit both the SRS and the PUSCH/PUCCH. Further, the DMRS is time-multiplexed together with the PUCCH or the PUSCH. In order to simplify a description, the DMRS is not shown in FIG. 6.

Figure 7:
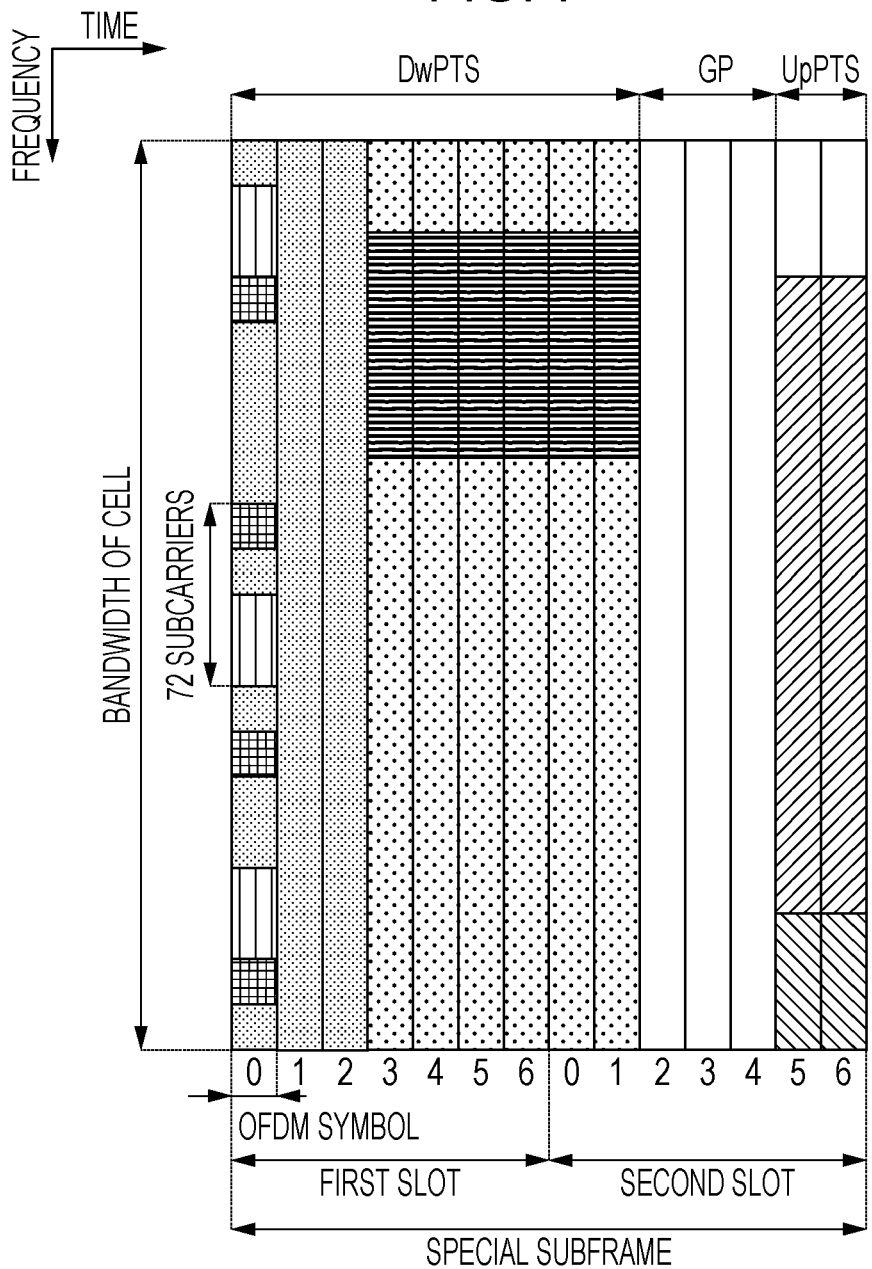
FIG. 7 is a diagram illustrating an example of an arrangement of physical channels and physical signals in a special subframe of the present embodiment.

FIG. 7 is a diagram illustrating an example of an arrangement of the physical channels and the physical signals in the special subframe of the present embodiment. In FIG. 7, the DwPTS is configured with the first to ninth SC-FDMA symbols in the special subframe, the GP is configured with the 10th to 12th SC-FDMA symbols in the special subframe, and the UpPTS is configured with the 13th and 14th SC-FDMA symbols in the special subframe.

The base station device 3 is able to transmit the PCFICH, the PHICH, the PDCCH, the ePDCCH, the PDSCH, and the downlink reference signal in the DwPTS of the special subframe. The base station device 3 does not transmit the PBCH and the synchronization signal in the DwPTS of the special subframe. The mobile station device 1 is able to transmit the PRACH and the SRS in the UpPTS of the special subframe. In other words, the mobile station device 1 does not transmit the PUCCH, PUSCH, and DMRS in the UpPTS of the special subframe.

Hereinafter, the physical channel and the physical signal which are transmitted in the flexible subframe will be described.

The base station device 3 is able to transmit at least the ePDCCH and the PDSCH in the flexible subframe. Further, the base station device 3 may transmit the PCFICH and the PDCCH in the flexible subframe. The base station device 3 does not transmit the PBCH and the synchronization signal in the flexible subframe. The mobile station device 1 is able to transmit the PUSCH, the DMRS, and the SRS in the flexible subframe. In other words, the mobile station device 1 does not transmit the PRACH and the PUSCH in the flexible subframe.

The mobile station device 1 regards the flexible subframe as the downlink subframe or the uplink subframe, depending on whether the transmission of the PUSCH and/or the SRS is scheduled in the flexible subframe. In other words, the mobile station device 1 determines whether to perform the consultation process of the downlink physical channel and/or the downlink physical signal in the flexible subframe, or to perform the transmission process of the uplink physical channel and/or the uplink physical signal in the flexible subframe, depending on whether the transmission of the PUSCH and/or the SRS is scheduled in the flexible subframe.

When the transmission of the PUSCH and the SRS is scheduled in the flexible subframe, the mobile station device 1 transmits the PUSCH and the SRS in the flexible subframe, and does not perform the reception process (monitoring) of the downlink control information through the PDCCH and/or the ePDCCH. When the transmission of the PUSCH and the SRS is scheduled in the flexible subframe, the mobile station device 1 regards the flexible subframe as the uplink subframe.

When the transmission of the SRS is not scheduled and the transmission of the PUSCH is scheduled in the flexible subframe, the mobile station device 1 transmits the PUSCH in the flexible subframe, and does not perform the reception process (monitoring) of the downlink control information through the PDCCH and/or the ePDCCH. When the transmission of the SRS is not scheduled and the transmission of the PUSCH is scheduled in the flexible subframe, the mobile station device 1 regards the flexible subframe as the uplink subframe.

When the transmission of the PUSCH is not scheduled and the transmission of the SRS is scheduled in the flexible subframe, the mobile station device 1 transmits the SRS in the flexible subframe, and does not perform the reception process (monitoring) of the downlink control information through the PDCCH and/or the ePDCCH. When the transmission of the PUSCH is not scheduled and the transmission of the SRS is scheduled in the flexible subframe, the mobile station device 1 regards the flexible subframe as the uplink subframe.

When the transmission of the PUSCH and the SRS is not scheduled in the flexible subframe, the mobile station device 1 performs the reception process (monitoring) of at least downlink grant through the PDCCH and/or the ePDCCH. When the downlink grant is detected in the flexible subframe, the mobile station device 1 performs the reception process of the PUSCH, depending on the downlink grant detected in the flexible subframe. When the transmission of the PUSCH and the SRS is not scheduled in the flexible subframe, the mobile station device 1 regards the flexible subframe as the downlink subframe.

The case in which the transmission of the PUSCH and the SRS is scheduled in the flexible subframe is the case of detecting (receiving) information for scheduling the PUSCH of the flexible subframe, in the downlink subframe before the flexible subframe.

Further, when the transmission of the PUSCH is not scheduled and the transmission of the SRS is scheduled in the flexible subframe, the mobile station device 1 may transmit the SRS in the flexible subframe, and may perform the reception process (monitoring) of the downlink control information (for example, a DCI format 3) other than the downlink grant by using the PDCCH, without performing the reception process (monitoring) of the ePDCCH. Since the PDCCH is disposed from the first symbol of the flexible subframe, and the SRS is disposed in the last symbol of the flexible subframe, the symbols in which the PDCCH and the SRS are not disposed exert a function of GP. In other words, when the transmission of the PUSCH is not scheduled and the transmission of the SRS is scheduled in the flexible subframe, the mobile station device 1 may regard the flexible subframe as the subframe including the field which is reserved for uplink transmission and the field which is reserved for downlink transmission.

In the TDD scheme in the related art, the mobile station device 1 does not need the GP, in order to switch an uplink transmission process to a downlink reception process. Further, in the TDD scheme in the related art, the mobile station device 1 uses the GP of the special subframe, in order to switch the downlink transmission process to the uplink reception process. However, the mobile station device 1 is able to switch the reception process of the PDSCH and the transmission process of the PUSCH in the flexible subframe, without limitation. Thus, a situation may occur in which the mobile station device 1 intends to perform the reception process of the PDSCH, in the flexible subframe immediately preceding the uplink subframe or the flexible subframe in which the transmission process of the PUSCH is performed, despite the absence of GP. In other words, it is required for the mobile station device 1 to simultaneously perform the reception process of the PUSCH and the transmission process of the PUSCH in the flexible subframe at the same frequency and the same timing, but such a process is not possible.

Hereinafter, the first embodiment of the present invention will be described.

Thus, in the first embodiment of the present invention, as shown in FIG. 3, it is assumed that the subframe immediately preceding the flexible subframe is the uplink subframe or the flexible subframe. Thus, the mobile station device 1 is able to normally perform the uplink transmission process or the downlink reception process in the flexible subframe, immediately after performing the uplink transmission process in the uplink subframe.

Further, in the first embodiment of the present invention, as shown in FIG. 3, it is assumed that the subframe immediately following the flexible subframe is the flexible subframe or the downlink subframe. By setting the subframe immediately following the flexible subframe as the downlink subframe, the mobile station device 1 is able to normally perform the downlink reception process in the downlink subframe, immediately after performing the uplink transmission process or the downlink reception process in the uplink subframe in the flexible subframe.

However, when the flexible subframes are continuous, there is a problem that the mobile station device 1 is not able to perform the transmission process of the PUSCH in the flexible subframe immediately following the flexible subframe in which the reception process of the PDSCH and/or the ePDCCH is performed, as described above.

FIG. 8 is a diagram illustrating an example of a transmission and reception process in the first embodiment of the present invention. In FIG. 8, the mobile station device 1 receives the PDSCH in the first flexible subframe, and transmits the PUSCH in the second flexible subframe immediately following the first flexible subframe. In FIG. 8, the mobile station device 1 generates the GP by not receiving a part of the first flexible subframe immediately preceding the second flexible subframe in which at least the PUSCH is scheduled. For example, the mobile station device 1 generates the GP by not receiving the last part or a portion of the second half of the first flexible subframe immediately preceding the second flexible subframe in which at least PUSCH is scheduled.

The length of the generated GP, in other words, the portion which is not received in the first flexible subframe may be determined by the mobile station device 1 based on the configuration (the length of the GP) of the special subframe. In other words, the mobile station device 1 may not receive a part of the downlink signals (the PDCCH, the ePDCCH, and the downlink reference signal) in the first flexible subframe immediately preceding the second flexible subframe in which at least the PUSCH is scheduled. In other words, the mobile station device 1 receives the physical downlink shared channel except for the last part (a necessary part for generating the GP) in the time domain, in the first flexible subframe immediately preceding the second flexible subframe in which at least the PUSCH is scheduled.

For example, when the PUSCH and the SRS are not scheduled in the first flexible subframe, and at least PUSCH is scheduled in the second flexible subframe immediately following the first flexible subframe, the mobile station device 1

(1) monitors the downlink grant used for scheduling the PUSCH in the first flexible subframe, and (2) receives the PDSCH except for the last part of the time domain, in the first flexible subframe, based on the detected downlink grant.

Further, the mobile station device 1 monitors information (for example, the uplink grant) used for scheduling the PUSCH and/or the SRS in the first flexible subframe and the second flexible subframe, in the downlink subframe before the first flexible subframe.

FIG. 9 is another diagram illustrating an example of a transmission and reception process in the first embodiment of the present invention. Since the SRS is transmitted only in the last (the 14th) SC-FDMA symbol in the subframe, the period of the first to 13th SC-FDMA symbols in the flexible subframe in which only the SRS is scheduled is the GP. Therefore, the mobile station device 1 does not need to generate the GP by not receiving the last part of the first flexible subframe immediately preceding the second flexible subframe in which only the SRS is scheduled. In other words, the mobile station device 1 is able to receive all downlink signals (the PDCCH, the ePDCCH, and the downlink reference signal) in the flexible subframe immediately preceding the flexible subframe in which only the SRS is scheduled.

Therefore, when the mobile station device 1 performs the uplink transmission process in the flexible subframe, the mobile station device 1 determines whether to generate the GP by not receiving the last part of the first flexible subframe immediately preceding the second flexible subframe that performs the uplink transmission process, according to the uplink physical channel and/or the uplink physical signal which is transmitted in the second flexible subframe that performs the uplink transmission process.

Thus, it is not required for the mobile station device 1 to simultaneously perform the uplink transmission process and the downlink reception process in the flexible subframe at the same timing in the same frequency. Further, the mobile station device 1 and the base station device 3 are able to efficiently communicate by using the flexible subframe.

Hereinafter, a second embodiment of the present embodiment will be described.

In the second embodiment of the present embodiment, the mobile station device 1 does not receive the ePDCCH but receives the PDCCH of the subframe immediately preceding the flexible subframe in which at least the PUSCH is scheduled. The mobile station device 1 does not monitor the downlink grant in the PDCCH of the subframe immediately preceding the flexible subframe in which at least the PUSCH is scheduled. The mobile station device 1 monitors the downlink control information (for example, DCI format 3) except for the downlink grant in the PDCCH of the subframe immediately preceding the flexible subframe in which at least the PUSCH is scheduled. Further, the mobile station device 1 may not receive the PDCCH of the subframe immediately preceding the flexible subframe in which at least the PUSCH is scheduled.

Thus, the mobile station device 1 does not receive the PDSCH in response to the downlink grant, in the subframe immediately preceding the flexible subframe in which at least the PUSCH is scheduled.

Alternatively, even if the mobile station device 1 detects the downlink grant in the PDCCH of the subframe immediately preceding the flexible subframe in which at least the PUSCH is scheduled, the mobile station device 1 may not receive the PDSCH in response to the downlink grant.

In other words, when at least the PUSCH is scheduled in a certain flexible subframe, the mobile station device 1 does not receive the PDCCH and the ePDCCH in the flexible subframe in which at least the PUSCH is scheduled, and the mobile station device 1 does not receive the ePDCCH but receives the PDCCH in the flexible subframe immediately preceding the flexible subframe in which at least the PUSCH is scheduled. Further, when at least the PUSCH is scheduled in a certain flexible subframe, the mobile station device 1 does not monitor the downlink grant in the flexible subframe in which at least the PUSCH is scheduled, and in the flexible subframe immediately preceding the flexible subframe in which at least the PUSCH is scheduled.

Further, the mobile station device 1 may receive the PDCCH and/or the ePDCCH in the flexible subframe immediately preceding the flexible subframe in which only the SRS is scheduled. Further, the mobile station device 1 may monitor the downlink grant in the PDCCH and/or the ePDCCH of the flexible subframe immediately preceding the flexible subframe in which only the SRS is scheduled.

Therefore, when the mobile station device 1 performs the uplink transmission process in the flexible subframe, the mobile station device 1 performs a determination of whether to receive the ePDCCH and a determination of whether to monitor the downlink grant in the PDCCH, in the flexible subframe immediately preceding the flexible subframe in which the uplink transmission process is performed, according to the uplink physical channel and/or the uplink physical signal which are transmitted in the flexible subframe subjected to the uplink transmission process.

In other words, when the PUSCH and the SRS are not scheduled in the first flexible subframe, and at least the PUSCH is scheduled in the second flexible subframe immediately following the first flexible subframe, the mobile station device 1 does not monitor the downlink grant used for scheduling the PDSCH in the first flexible subframe and the second flexible subframe.

Thus, the mobile station device 1 does not perform the reception process of the ePDCCH and the PDSCH, in the flexible subframe immediately preceding the flexible subframe in which at least the PUSCH is scheduled. Further, the mobile station device 1 and the base station device 3 are able to efficiently communicate by using the flexible subframe.

Hereinafter, a third embodiment of the present embodiment will be described.

In the third embodiment of the present embodiment, the mobile station device 1 regards the flexible subframe in which the PUSCH and/or SRS are scheduled, as the uplink subframe. Further, the mobile station device 1 regards the flexible subframes preceding the flexible subframe in which the PUSCH and/or the SRS are scheduled among continuous flexible subframes, as the uplink subframe. In other words, the mobile station device 1 regards the continuous flexible subframes previous to the last flexible subframe in which PUSCH is scheduled of the continuous flexible subframes as the uplink subframes. The mobile station device 1 regards the flexible subframes following the last flexible subframe in which the PUSCH and/or the SRS are scheduled among continuous flexible subframes, as the downlink subframes. When the PUSCH and/or the SRS are not scheduled in any of continuous flexible subframes, the mobile station device 1 regards all continuous flexible subframes as the downlink subframe.

The mobile station device 1 does not perform the downlink reception process in the flexible subframe which is regarded as the uplink subframe. In other words, the mobile station device 1 does not perform the reception of the downlink physical channel and the downlink physical signal, in the flexible subframe which is regarded as the uplink subframe. In other words, the mobile station device 1 does not monitor the downlink grant, in the flexible subframe which is regarded as the uplink subframe.

The mobile station device 1 performs the reception of the downlink physical channel and the downlink physical signal, in the flexible subframe which is regarded as the downlink subframe. For example, when the resource of the PDSCH is configured in the flexible subframe which is regarded as the downlink subframe, the mobile station device 1 receives the PDSCH. For example, the mobile station device 1 monitors the downlink grant in the flexible subframe which is regarded as the downlink subframe, the mobile station device 1 receives the PDSCH in the flexible subframe, based on the detected downlink grant.

In other words, when both or any one of the uplink physical channel and the uplink physical signal is scheduled in at least one of the continuous flexible subframes, the mobile station device 1 of the third embodiment.

(1) does not monitor the downlink grant used for scheduling the downlink physical channel, in the flexible subframe in which both or any one of the uplink physical channel and the uplink physical signal is scheduled, among the continuous flexible subframes, (2) does not monitor the downlink grant used for scheduling the downlink physical channel, in the flexible subframe preceding the flexible subframe in which both or any one of the uplink physical channel and the uplink physical signal is scheduled, among the continuous flexible subframes, and (3) monitors the downlink grant used for scheduling the downlink physical channel, in the flexible subframe following the last flexible subframe in which both or any one of the uplink physical channel and the uplink physical signal is scheduled, among the continuous flexible subframes.

Further, when the uplink physical channel and the uplink physical signal are not scheduled in any of the continuous flexible subframes, the mobile station device 1 of the third embodiment regards all continuous flexible subframes as the downlink subframe.

FIG. 10 is a diagram illustrating a first example of a third embodiment of the present invention. In FIG. 10, the horizontal axis is the time domain. FIG. 10 illustrates three continuous subframes in the time domain (the first, second and third flexible subframes). In FIG. 10, for the mobile station device 1, the PUSCH and the SRS are not scheduled in the first and second flexible subframes, and the PUSCH and/or the SRS are scheduled in the third flexible subframe.

In FIG. 10, the mobile station device 1 regards the third flexible subframe in which the PUSCH and/or the SRS are scheduled as the uplink subframe. Further, in FIG. 10, the mobile station device 1 regards the first and second flexible subframes that come before the third flexible subframe in the last part of which the PUSCH and/or the SRS are scheduled, as the uplink subframe.

FIG. 11 is a diagram illustrating a second example of a third embodiment of the present invention. In FIG. 11, the horizontal axis is the time domain. FIG. 11 illustrates three continuous subframes in the time domain (the first, second and third flexible subframes). In FIG. 11, for the mobile station device 1, the PUSCH and the SRS are not scheduled in the second flexible subframes, and the PUSCH and/or the SRS is scheduled in the first and third flexible subframes.

In FIG. 11, the mobile station device 1 regards the first and third flexible subframes in which the PUSCH and/or the SRS are scheduled, as the uplink subframe. Further, in FIG. 11, the mobile station device 1 regards the second flexible subframe preceding the third flexible subframe in which the PUSCH and/or the SRS are scheduled in the last part, as the uplink subframe.

Figure 12:
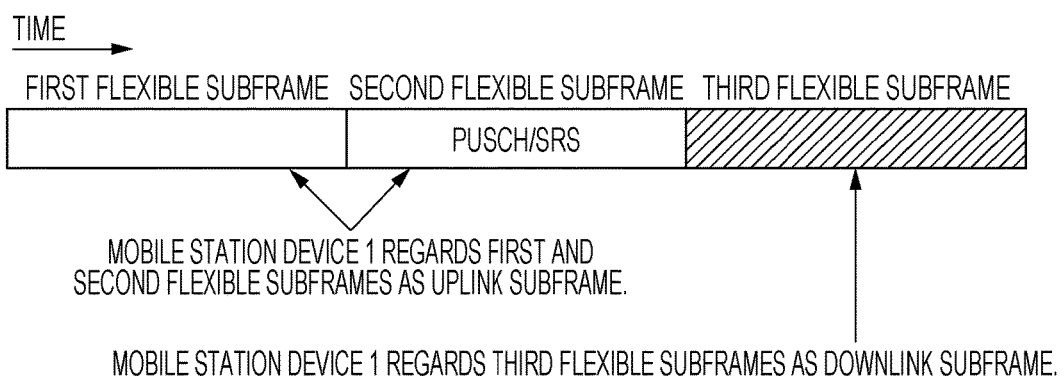
FIG. 12 is a diagram illustrating a third example of the third embodiment of the present invention.

FIG. 12 is a diagram illustrating a third example of a third embodiment of the present invention. In FIG. 12, the horizontal axis is the time domain. FIG. 12 illustrates three continuous subframes in the time domain (the first, second and third flexible subframes). In FIG. 12, the mobile station device 1 does not schedule the PUSCH and the SRS in the first and third flexible subframes, and scheduls the PUSCH and/or the SRS in the second flexible subframe.

In FIG. 12, the mobile station device 1 regards the second flexible subframe in which the PUSCH and/or the SRS are scheduled, as the uplink subframe. Further, in FIG. 12, the mobile station device 1 regards the first flexible subframe preceding the second flexible subframe in the last part of which the PUSCH and/or the SRS are scheduled, as the uplink subframe. Further, in FIG. 12, the mobile station device 1 regards the first flexible subframe following the second flexible subframe in the last part of which the PUSCH and/or the SRS are scheduled, as the downlink subframe.

Figure 13:
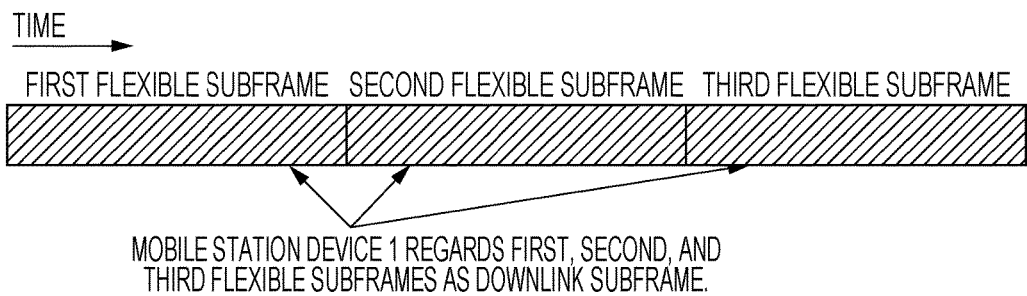
FIG. 13 is a diagram illustrating a fourth example of the third embodiment of the present invention.

FIG. 13 is a diagram illustrating a fourth example of the third embodiment of the present invention. In FIG. 13, the horizontal axis is the time domain. FIG. 13 illustrates three continuous subframes in the time domain (the first, second and third flexible subframes). In FIG. 13, the mobile station device 1 does not schedule the PUSCH and the SRS in any of the first, second and third flexible subframes. In FIG. 13, the mobile station device 1 regards all of the first, second and third flexible subframes as the downlink subframe.

Further, when only two flexible subframes are continuous, the mobile station device 1 may regard the flexible subframe immediately preceding the flexible subframe in which the PUSCH is scheduled, as the uplink subframe.

Further, when flexible subframes are not continuous, the third embodiment is not applied. For example, when the first flexible subframe is continuous with the second flexible subframe, and the third flexible subframe is not continuous with any of flexible subframes, the third embodiment is applied to the first flexible subframe and the second flexible subframe, but the third embodiment is not applied to the third flexible subframe.

Thus, the mobile station device 1 does not regard the continuous flexible subframes which come before the flexible subframe which is regarded as the uplink subframe among the continuous flexible subframes, as the downlink subframe. Accordingly, even if there is a flexible subframe in which the uplink transmission process is switched to the downlink reception process, among the continuous flexible subframes, the mobile station device 1 does not switch the downlink reception process to the uplink transmission process. Further, the mobile station device 1 and the base station device 3 are able to efficiently communicate by using the flexible subframe.

Hereinafter, the device configuration of the present embodiment will be described.

Figure 14:
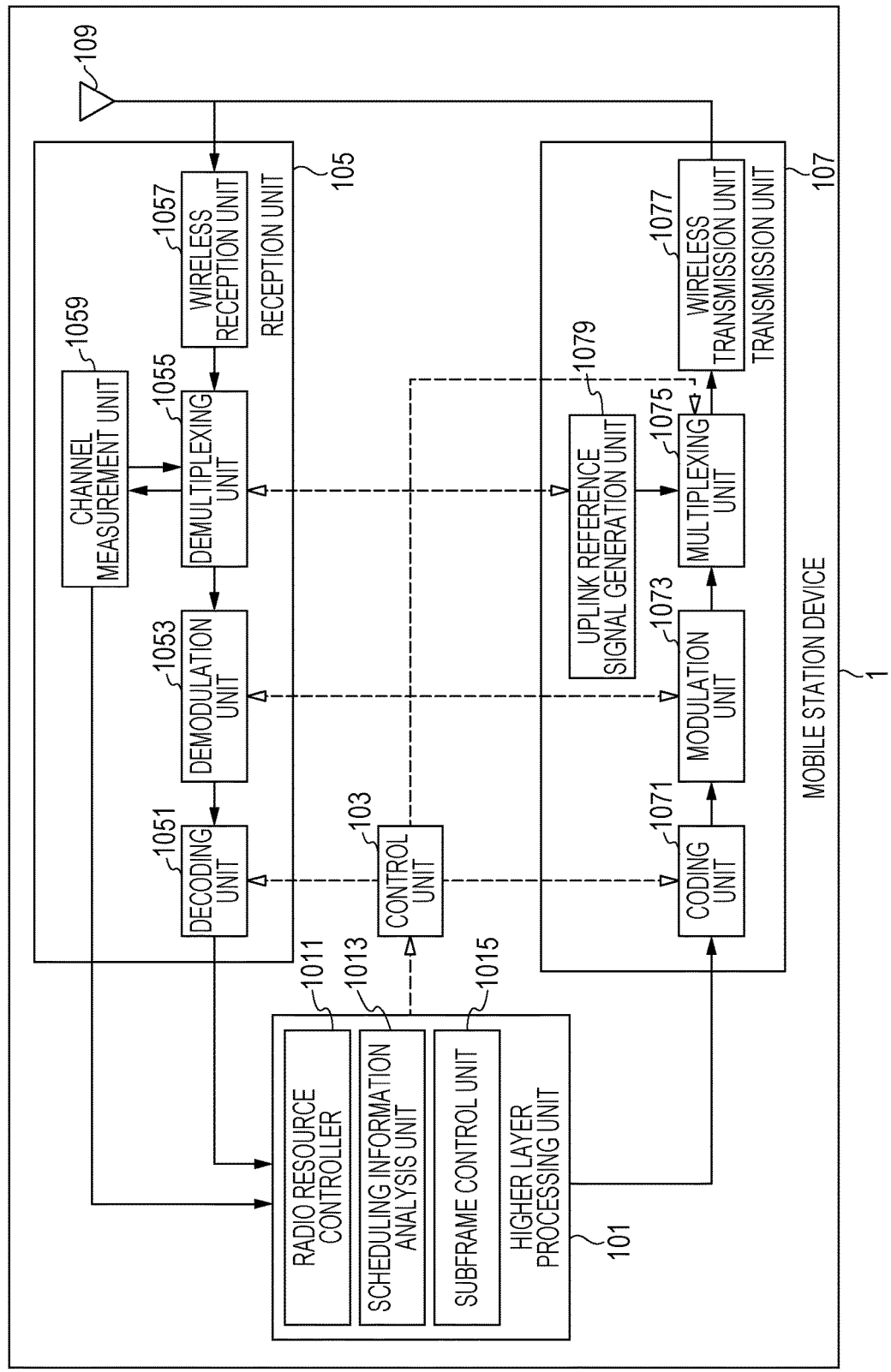
FIG. 14 is a schematic block diagram illustrating a configuration of a mobile station device 1 of the present embodiment.

FIG. 14 is a schematic block diagram illustrating a configuration of a mobile station device 1 of the present embodiment. As illustrated, the mobile station device 1 is configured to include a higher layer processing unit 101, a control unit 103, a reception unit 105, a transmission unit 107, and a transmitting and receiving antenna 109. Further, the higher layer processing unit 101 is configured to include a radio resource control unit 1011, a scheduling information analysis unit 1013, and a subframe control unit 1015. The reception unit 105 is configured to include a decoding unit 1051, a demodulation unit 1053, a demultiplexing unit 1055, a wireless reception unit 1057, and a channel measurement unit 1059. Further, the transmission unit 107 is configured to include a coding unit 1071, a modulation unit 1073, a multiplexing unit 1075, a wireless transmission unit 1077, and an uplink reference signal generation unit 1079.

The higher layer processing unit 101 outputs the uplink data (transport block) generated by the operation and the like of a user to the transmission unit 107. Furthermore, the higher layer processing unit 101 processes a Medium Access Control (MAC) layer, a Packet Data Convergence Protocol (PDCP) layer, a Radio Link Control (RLC) layer, and a Radio Resource Control (RRC) layer.

The radio resource control unit 1011 included in the higher layer processing unit 101 manages various pieces of configuration information of the mobile station device 1. The radio resource control unit 1011 manages the uplink-downlink configuration. Further, the radio resource control unit 1011 generates information to be arranged in each uplink channel, and outputs the information to the transmission unit 107.

The scheduling information analysis unit 1013 included in the higher layer processing unit 101 analizes the information used for scheduling the physical channels (such as PUSCH and PDSCH) received through the reception unit 105, generates control information for controlling the reception unit 105 and the transmission unit 107 base on the result from analizes the information, and outputs the generated control information to the control unit 103.

The subframe control unit 1015 included in the higher layer processing unit 101 determines whether to perform either a downlink reception process or to perform uplink transmission process in a flexible subframe. Further, the subframe control unit 1015 determines whether to perform either a reception process of PDCCH and/or ePDCCH in the flexible subframe. Further, the subframe control unit 1015 determines whether to monitor the downlink grant in the PDCCH and/or ePDCCH in the flexible subframe.

The control unit 103 generates a control signal for controlling the reception unit 105 and the transmission unit 107, based on the control information from the higher layer processing unit 101. The control unit 103 outputs the generated control signal to the reception unit 105 and the transmission unit 107 so as to control the reception unit 105 and the transmission unit 107.

The reception unit 105 performs separation, demodulation, and decoding on the signal received from the base station device 3 through the transmitting and receiving antennas 109, according to the control signal that is input from the control unit 103, and outputs the decoded information to the higher layer processing unit 101.

The wireless reception unit 1057 converts (down-converts) the downlink signal received through the transmitting and receiving antenna 109 into a signal of an intermediate frequency, removes unnecessary frequency components, controls an amplification level so as to appropriately maintain the signal level, performs quadrature demodulation on the received signal, based on the in-phase and quadrature components thereof, and converts an analog signal subjected to the quadrature demodulation into a digital signal. The wireless reception unit 1057 removes a portion corresponding to a Guard Interval (GI) from the converted digital signal. The wireless reception unit 1057 performs Fast Fourier Transform (FFT) on the signal obtained by removing the guard interval so as to extract a signal of a frequency domain.

The demultiplexing unit 1055 respectively separates the extracted signal into PHICH, PDCCH, ePDCCH, PDSCH, and the downlink reference signal. Further, the demultiplexing unit 1055 performs channel compensation of PHICH, PDCCH, and PDSCH, from the estimated value of the channel which is input from the channel measurement unit 1059. Further, the demultiplexing unit 1055 outputs the separated downlink reference signal to the channel measurement unit 1059.

The demodulation unit 1053 multiplies the corresponding code by PHICH to synthesize a signal, performs demodulation of a Binary Phase Shift Keying (BPSK) modulation scheme on the synthesized signal, and outputs the decoded signal to the decoding unit 1051. The decoding unit 1051 decodes the PHICH addressed to its own device, and outputs the decoded HARQ indicator to the higher layer processing unit 101. The demodulation unit 1053 performs demodulation of a QPSK modulation scheme on PDCCH and/or ePDCCH, and outputs decoded PDCCH to the decoding unit 1051. The decoding unit 1051 attempts to perform blind decoding of PDCCH and/or ePDCCH, and if the blind decoding is successful, the decoding unit 1051 outputs RNTI that is included in the downlink control information that has been decoded and outputs the downlink control information to the higher layer processing unit 101.

The demodulation unit 1053 performs demodulation of a modulation scheme which is notified in the downlink grant, such as Quadrature Phase Shift Keying (QPSK), 16 Quadrature Amplitude Modulation (QAM), and 64 QAM, on the PDSCH, and outputs demodulated signal to the decoding unit 1051. The decoding unit 1051 performs decoding based on information regarding a coding rate which is notified in downlink control information, and outputs the decoded downlink data (transport block) to the higher layer processing unit 101.

The channel measurement unit 1059 measures a path loss of downlink and channel state from the downlink reference signal which is input from the demultiplexing unit 1055, and outputs the measured path loss and channel state to the higher layer processing unit 101. Further, the channel measurement unit 1059 calculates an estimation value of a channel of the downlink from the downlink reference signal, and outputs the calculated estimation value to the demultiplexing unit 1055.

The transmission unit 107 generates an uplink reference signal according to the control signal input from the control unit 103, codes and modulates the uplink data (transport block) which is input from the higher layer processing unit 101, multiplexes the PUSCH, the PUSCH, and the generated uplink reference signal, and transmits the multiplexed signals to the base station device 3 through the transmitting and receiving antenna 109.

The coding unit 1071 performs coding such as convolutional coding and block coding on the uplink control information which is input from the higher layer processing unit 101. Further, the coding unit 1071 performs a turbo coding based on the information used for the scheduling of PUSCH.

The modulation unit 1073 modulates the coded bits which are input from the coding unit 1071 by a modulation scheme notified by the downlink control information or a predetermined modulation scheme for each channel, such as BPSK, QPSK, 16 QAM, and 64 QAM. The modulation unit 1073 determines the number of sequences of data to be spatially multiplexed, based on information used for scheduling the PUSCH, maps a plurality of pieces of uplink data to be transmitted in the same PUSCH to a plurality of sequences by using the MIMO SM, and performs precoding on this series.

The uplink reference signal generation unit 1079 generates a sequence obtained by a predetermined rule, based on a physical cell identity (also referred to as PCI, a Cell ID and the like) for identifying the base station device 3, a bandwidth for arranging the uplink reference signal, a cyclic shift which has been notified by the uplink grant, and a value or the like of the parameter for the generation of the DMRS sequence. The multiplexing unit 1075 rearranges the modulation symbols of PUSCH in parallel and performs Discrete Fourier Transform (DFT) on the modulation symbols, according to the control signal input from the control unit 103. Further, the multiplexing unit 1075 multiplexes the signals of the PUCCH and the PUSCH and the generated uplink reference signal for each transmission antenna port. In other words, the multiplexing unit 1075 arranges the signals of PUCCH and PUSCH and the generated uplink reference signal in the resource element for each transmission antenna port.

The wireless transmission unit 1077 performs Inverse Fast Fourier Transform (IFFT) and performs modulation of a SC-FDMA scheme on the multiplexed signals, adds a guard interval to the SC-FDMA symbols which have been subjected to the SC-FDMA modulation to generate a digital baseband signal, converts the digital baseband signal into an analog signal to generate the in-phase and quadrature components of an intermediate frequency from the analog signal, removes extra frequency components for an intermediate frequency band, converts (up-converts) the intermediate frequency signals into high frequency signals, removes extra frequency components, amplifies the power, and outputs the amplified signals to the transmitting and receiving antenna 109 for transmission.

Figure 15:
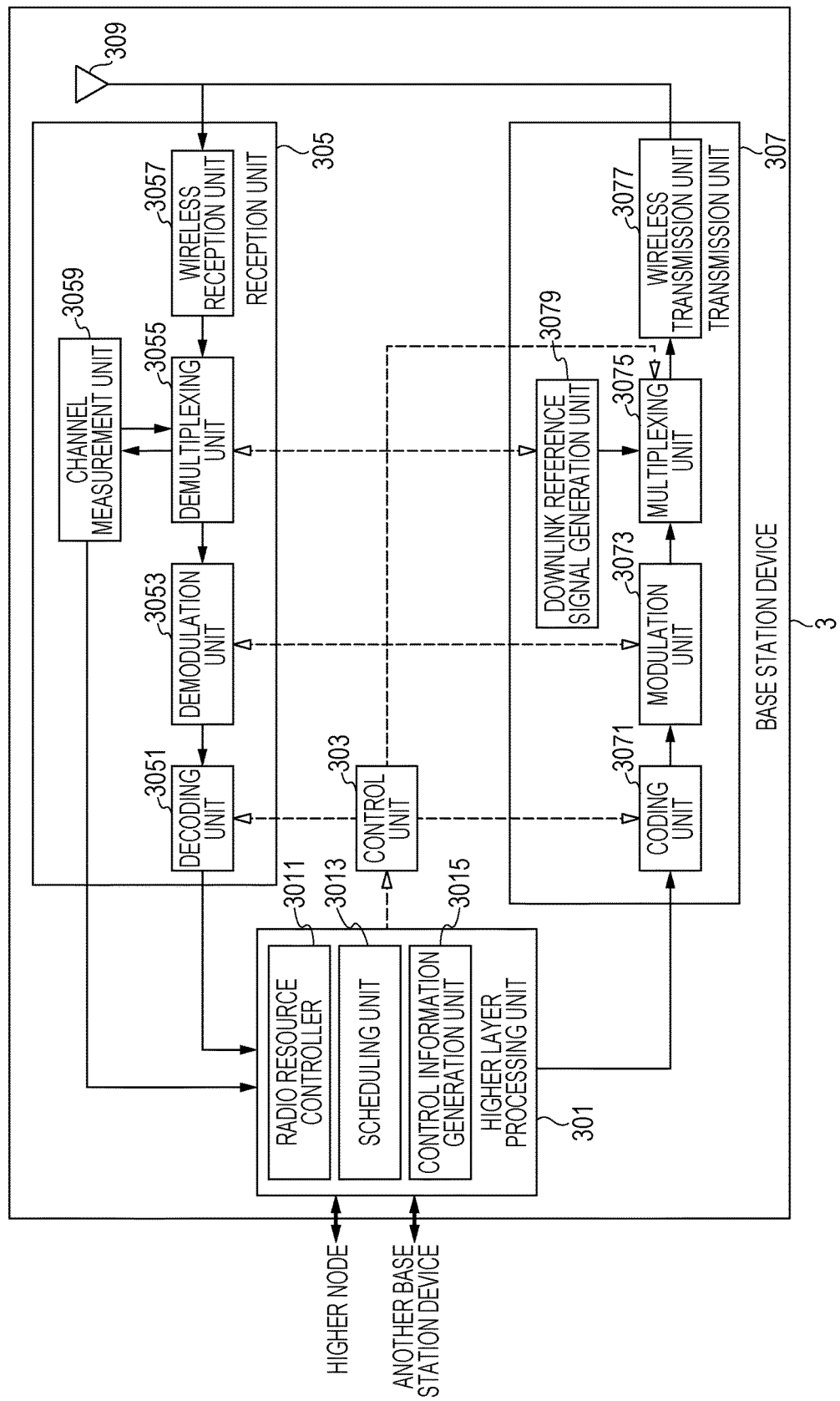
FIG. 15 is a schematic block diagram illustrating a configuration of a base station device 3 of the present embodiment.

FIG. 15 is a schematic block diagram illustrating a configuration of a base station device 3 of the present embodiment. As illustrated, the base station device 3 is configured to include a higher layer processing unit 301, a control unit 303, a reception unit 305, a transmission unit 307, and a transmitting and receiving antenna 309. Further, the higher layer processing unit 301 is configured to include a radio resource control unit 3011, a scheduling unit 3013, and a control information generation unit 3015. Further, the reception unit 305 is configured to include a decoding unit 3051, a demodulation unit 3053, a demultiplexing unit 3055, a wireless reception unit 3057, and a channel measurement unit 3059. Further, the transmission unit 307 is configured to include a coding unit 3071, a modulation unit 3073, a multiplexing unit 3075, a wireless transmission unit 3077, and a downlink reference signal generation unit 3079.

The higher layer processing unit 301 processes a Medium Access Control (MAC) layer, a Packet Data Convergence Protocol (PDCP) layer, a Radio Link Control (RLC) layer, and a Radio Resource Control (RRC) layer. Further, the higher layer processing unit 301 generates control information for controlling the reception unit 305 and the transmission unit 307, and outputs the control information to the control unit 303.

A radio resource control unit 3011 included in the higher layer processing unit 301 generates downlink data (transport block) arranged in the PDSCH of the downlink, RRC signaling, and MAC Control Element (CE), or acquires them from the higher node, and outputs them to the transmission unit 307. Further, the radio resource control unit 3011 manages various pieces of configuration information of respective mobile station devices 1. The radio resource control unit 3011 manages uplink-downlink configuration of each mobile station device 1.

The scheduling unit 3013 included in the higher layer processing unit 301 determines frequencies and subframes to be assigned for the physical channels (PDSCH and PDSCH), code rates of the physical channels (PDSCH and PDSCH), a modulation scheme, and transmission power, from the estimated value of the channel which is input from the channel measurement unit 3059, the channel quality, and the like. The scheduling unit 3013 determines whether to schedule the downlink physical channel and/or the downlink physical signal or the uplink physical channel and/or the uplink physical signal in the flexible subframe. The scheduling unit 3013 generates control information in order to perform the control of the reception unit 305 and the transmission unit 307, based on the scheduling result, and outputs the generated control information to the control unit 303. Further, the scheduling unit 3013 outputs the scheduling result of the physical channel (PDSCH and PUSCH) to the control information generation unit 3015.

The control information generation unit 3015 generates information used for scheduling the physical channels (PDSCH and PUSCH), based on the scheduling result which is input from the scheduling unit 3013. Further, the control information generation unit 3015 generates a handover command. Further, the control information generation unit 3015 outputs the generated information to the transmission unit 307.

The control unit 303 generates a control signal for controlling the reception unit 305 and the transmission unit 307, based on the control information from the higher layer processing unit 301. The control unit 303 outputs the generated control signal to the reception unit 305 and the transmission unit 307 and controls the reception unit 305 and the transmission unit 307.

The reception unit 305 performs separation, demodulation, and decoding on the reception signal received from the mobile station device 1 through the transmitting and receiving antennas 309, according to the control signal that is input from the control unit 303, and outputs the decoded information to the higher layer processing unit 301. The wireless reception unit 3057 converts (down-converts) the uplink signal received through the transmitting and receiving antenna 309 into a signal of an intermediate frequency, removes unnecessary frequency components, controls an amplification level so as to appropriately maintain the signal level, performs quadrature demodulation on the received signal, based on the in-phase and quadrature components thereof, and converts an analog signal subjected to the quadrature demodulation into a digital signal.

The wireless reception unit 3057 removes a portion corresponding to Guard Interval (GI) from the converted digital signal. The wireless reception unit 3057 performs Fast Fourier Transform (FFT) on the signal obtained by removing the guard interval so as to extract and output a signal of a frequency domain to the demultiplexing unit 3055.

The demultiplexing unit 1055 separates the signal input from the wireless reception unit 3057 into PUCCH, PUSCH, the uplink reference signal, and the like. Further, the separation is performed based on the radio resource assignment information contained in the uplink grant that the base station device 3 has determined in advance in the radio resource control unit 3011 and notified to each mobile station device 1. Further, the demultiplexing unit 3055 performs channel compensation of PUCCH and PUSCH, from the estimated value of the channel which is input from the channel measurement unit 3059. Further, the demultiplexing unit 3055 outputs the separated uplink reference signal to the channel measurement unit 3059.

The demodulation unit 3053 acquires modulation symbols by performing Inverse Discrete Fourier Transform (IDFT) on the PUSCH, and demodulates each modulation symbol of PUCCH and PUSCH in the received signal by using a modulation scheme such as Binary Phase Shift Keying (BPSK), QPSK, 16 QAM, and 64 QAM, that is predetermined or that the base station device 3 has notified in advance to each mobile station device 1 by the uplink grant. The demodulation unit 3053 separates the modulation symbol of a plurality of pieces of uplink data which are transmitted in the same PUSCH by using MIMO SM, based on the number of sequences which are notified in advance to each mobile station device 1 through the uplink grant and are spatially multiplexed and information indicating precoding to be performed on the sequence.

The decoding unit 3051 decodes the coded bits of the demodulated PUSCH and PUSCH at a coding rate that is predetermined or that the base station device 3 has notified in advance to each the mobile station device 1 by the uplink grant, by using the predetermined coding scheme, and outputs the decoded uplink data and the uplink control information to the higher layer processing unit 101. When the PUSCH is retransmitted, the decoding unit 3051 performs decoding by using the coded bits that are input from the higher layer processing unit 301 and stored in the HARQ buffer, and the demodulated coded bits. The channel measurement unit 309 measures the estimated value of the channel, the quality of the channel and the like from the uplink reference signal that is input from the demultiplexing unit 3055, and outputs the measured value to the demultiplexing unit 3055 and the higher layer processing unit 301.

The transmission unit 307 generates a downlink reference signal according to a control signal that is input from the control unit 303, codes and modulates the HARQ indicator, the downlink control information, and the downlink data that are input from the higher layer processing unit 301, multiplexes the PHICH, the PDCCH, the ePDCCH, the PDSCH, and the downlink reference signal, and transmits the signals to the mobile station device 1 through the transmitting and receiving antenna 309.

The coding unit 3071 performs coding by using a predetermined coding scheme such as block coding, convolutional coding, and turbo coding or performs coding by using the coding scheme that is determined by the radio resource control unit 3011 on the HARQ indicator, the downlink control information, and the downlink data that are input from the higher layer processing unit 301. The modulation unit 3073 modulates the coded bits which are input from the coding unit 3071 by a modulation scheme such as BPSK, QPSK, 16 QAM, and 64 QAM, that is predetermined, or determined by the radio resource control unit 3011.

The downlink reference signal generation unit 3079 generates a sequence that is known by the mobile station device 1 and is determined by a predetermined rule based on the physical cell identifier (PCI) for identifying the base station device 3, and the like, as the downlink reference signal. The multiplexing unit 3075 multiplexes the modulation symbols for each modulated channel and the generated downlink reference signal. In other words, the multiplexing unit 3075 arranges the modulation symbols for each modulated channel and the generated downlink reference signal in the resource element.

The wireless transmission unit 3077 performs Inverse Fast Fourier Transform (IFFT) and performs modulation of an OFDM scheme on the multiplexed modulation symbols or the like, adds a guard interval to the OFDM symbols which have been subjected to the OFDM modulation to generate a digital baseband signal, converts the digital baseband signal into an analog signal to generate the in-phase and quadrature components of an intermediate frequency from the analog signal, removes extra frequency components for an intermediate frequency band, converts (up-converts) the intermediate frequency signals into high frequency signals, removes extra frequency components, amplifies the power, and outputs the amplified signals to the transmitting and receiving antenna 309 for transmission.

The programs operating in the base station device 3 and the mobile station device 1 according to the present invention may be programs for controlling a Central Processing Unit (CPU) (programs for causing a computer to function) so as to realize the functions of the above embodiments according to the present invention. Then, information handled by these devices is temporarily stored in a Random Access Memory (RAM) during the process, and thereafter, is stored in various ROMs such as a Flash Read Only Memory (ROM) or a Hard Disk Drive (HDD), and is read by the CPU as necessary for performing modification and writing.

Further, the computer may implement a portion of the mobile station device 1 and the base station device 3 in the embodiments described above. In this case, a program for implementing the control function may be recorded on a computer readable recording medium, and the program that is recorded in the recording medium may be realized by causing a computer system to read and execute the program.

Further, it is assumed that the term "computer system" herein is a computer system that is incorporated into the mobile station device 1 or the base station device 3 and includes an OS and hardware such as peripheral devices. Further, the "computer-readable recording medium" means a portable medium such as a flexible disk, a magneto-optical disk, a ROM, a CD-ROM, or a storage device such as a hard disk built in the computer system.

Further, the "computer-readable recording medium" may include those that store a program dynamically during a short time, such as communication lines in which the program is transmitted through a network such as the Internet or a communication line such as a telephone line, and those that store the program for a certain period of time, such as a volatile memory in the computer system which is a server and a client in this case. Further, the program may be a program for implementing a portion of the above functions or a program for implementing the functions described above in conjunction with programs already recorded on the computer system.

Further, the entirety or a portion of the mobile station device 1 and the base station device 3 in the above described embodiment may be typically implemented as an LSI which is an integrated circuit, or may be implemented as a chipset. The respective functional blocks of the mobile station device 1 and the base station device 3 may be formed into respective chips, or the entirety or a portion thereof may be integrated and formed into a chip. Further, a circuit integration technology is not limited to an LSI, and may be implemented as a dedicated circuit, or in a general purpose processor. Further, when the circuit integration technology that replaces the LSI appears with the advance of a semiconductor technology, it is possible to use an integrated circuit according to the technology.

Hitherto, one embodiment of the present invention has been described in detail with reference to the accompanying drawings, the specific configuration is not limited to those described above, and various design modifications are possible within the scope without departing from the spirit of the present invention.

REFERENCE SIGNS LIST 1 (1A, 1B, 1C) MOBILE STATION DEVICE
3 BASE STATION DEVICE
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL UNIT
1013 SCHEDULING INFORMATION ANALYSIS UNIT
1015 SUBFRAME CONTROL UNIT
3011 RADIO RESOURCE CONTROL UNIT
3013 SCHEDULING UNIT
3015 CONTROL INFORMATION GENERATION UNIT

The invention claimed is:

1. A mobile station device comprising:
a receiver that receive: (i) a system information block via a physical downlink shared channel, the system information block including first information which indicates a frame structure which includes one or more downlink subframes, one or more uplink subframes, one or more special subframes, and one or more sets of continuous flexible subframes which are continuous in a time domain in a frame, and (ii) second information via a physical downlink control channel; and
a controller that controls in which subframes uplink or downlink transmissions may take place in a frame on the basis of the second information, wherein
each of flexible subframes within the one or more sets of continuous flexible subframes is configured as an uplink subframe or a downlink subframe on the basis of the second information, and
within the set of continuous flexible subframes in the frame, every subframe preceding a flexible subframe configured as an uplink subframe.

2. The mobile station device according to claim 1, wherein
a subframe immediately following the continuous flexible subframes is a downlink subframe.

3. A radio communication method used for a terminal device, the radio communication method comprising:
receiving a system information block via a physical downlink shared channel, the system information block including first information which indicates a frame structure which includes one or more downlink subframes, one or more uplink subframes, one or more special subframes and one or more sets of continuous flexible subframes which are continuous in a time domain in a frame,
receiving second information via a physical downlink control channel; and
controlling, on the basis of the second information, in which subframes uplink or downlink transmissions may take place in a frame, wherein
each of flexible subframes within the one or more sets of continuous flexible subframes is configured as an uplink subframe or a downlink subframe on the basis of the second information, and
within the set of continuous flexible subframes in the frame, every subframe preceding a flexible subframe configured as an uplink subframe.

4. The radio communication method according to claim 3, wherein
a subframe immediately following the continuous flexible subframes is a downlink subframe.

5. A base station device comprising:
a transmitter that transmit: (i) a system information block via a physical downlink shared channel, the system information block including first information which indicates a frame structure which includes one or more downlink subframes, one or more uplink subframes, one or more special subframes, and one or more sets of continuous flexible subframes which are continuous in a time domain in a frame, and (ii) second information via a physical downlink control channel; and
a controller that controls in which subframes uplink or downlink transmissions occur in a frame on the basis of the second information, wherein
each of flexible subframes within the one or more sets of continuous flexible subframes is configured as an uplink subframe, or a downlink subframe, on the basis of the second information, and
within the sets of continuous flexible subframes in the frame, every subframe preceding a flexible subframes configured as an uplink subframe.

6. The base station device according to claim 5, wherein
a subframe immediately following the continuous flexible subframes is a downlink subframe.

7. A radio communication method used for a base station device, the radio communication method comprising:
transmitting a system information block via a physical downlink shared channel, the system information block including first information which indicates a frame structure which includes one or more downlink subframes, one or more uplink subframes, one or more special subframes and one or more sets of continuous flexible subframes which are continuous in a time domain in a frame, transmitting second information via a physical downlink control channel; and controlling in which subframes uplink or downlink transmissions may take place in a frame on the basis of the second information, wherein each of flexible substrates within the one or more sets of continuous flexible subframes is configured as an uplink subframe, or a downlink subframe, on the basis of the second information, and within the set of continuous flexible subframes in the frame, every subframe preceding a flexible subframe configured as an uplink subframe.

8. The radio communication method according to claim 7, wherein a subframe immediately following the continuous flexible subframes is a downlink subframe.

\* \* \* \* \*